US010460132B2

(12) United States Patent
Soffer

(10) Patent No.: US 10,460,132 B2
(45) Date of Patent: Oct. 29, 2019

(54) SECURITY KEYS ASSOCIATED WITH IDENTIFICATION OF PHYSICAL USB PROTECTION DEVICES

(71) Applicant: HIGH SEC LABS LTD, Yokneam Industrial Zone (IL)

(72) Inventor: Aviv Soffer, Caesarea (IL)

(73) Assignee: HIGH SEC LABS LTD, Yokneam Industrial Zone (IL)

( * ) Notice: Subject to any disclaimer, the term of this patent is extended or adjusted under 35 U.S.C. 154(b) by 0 days.

(21) Appl. No.: 15/919,933

(22) Filed: Mar. 13, 2018

(65) Prior Publication Data

US 2018/0204027 A1 Jul. 19, 2018

Related U.S. Application Data

(63) Continuation of application No. 15/648,659, filed on Jul. 13, 2017, now Pat. No. 9,940,487, which is a continuation of application No. 14/588,525, filed on Jan. 2, 2015, now Pat. No. 9,734,358.

(51) Int. Cl.
| | |
|---|---|
| *H04L 29/06* | (2006.01) |
| *G06F 21/86* | (2013.01) |
| *G06F 21/44* | (2013.01) |
| *G06F 21/85* | (2013.01) |
| *H01R 13/443* | (2006.01) |
| *H01R 13/66* | (2006.01) |
| *H01R 4/48* | (2006.01) |
| *H01R 13/717* | (2006.01) |
| *H04L 29/08* | (2006.01) |
| *H04L 12/24* | (2006.01) |

(52) U.S. Cl.
CPC .............. *G06F 21/86* (2013.01); *G06F 21/44* (2013.01); *G06F 21/85* (2013.01); *H01R 4/4809* (2013.01); *H01R 13/443* (2013.01); *H01R 13/665* (2013.01); *H01R 13/7175* (2013.01); *H01R 2201/06* (2013.01)

(58) Field of Classification Search
CPC ........................................................ G06F 21/86
USPC ............................................................ 726/16
See application file for complete search history.

(56) References Cited

U.S. PATENT DOCUMENTS

| | | | | |
|---|---|---|---|---|
| 7,364,463 | B1* | 4/2008 | Ju | H01R 13/658 |
| | | | | 439/607.55 |
| 7,584,313 | B1* | 9/2009 | Hay | G06F 13/385 |
| | | | | 710/15 |
| 2004/0044819 | A1* | 3/2004 | Jeon | G06F 13/385 |
| | | | | 710/305 |
| 2006/0185878 | A1 | 8/2006 | Soffer | |
| 2006/0190739 | A1 | 8/2006 | Soffer | |

(Continued)

*Primary Examiner* — Haresh N Patel
(74) *Attorney, Agent, or Firm* — Browdy and Neimark, PLLC

(57) ABSTRACT

A self-locking USB filter device is disclosed that comprises at least one permanently attachable self-locking USB plug having at least one locking tooth to permanently connect the permanently attachable self-locking USB plug to a USB jack of a protected computing apparatus. The self-locking USB filter protects the protected computing apparatus by blocking unauthorized data transfer and blocks all communication unless the authenticator is authenticated by software installed in the protected computing apparatus. A method of protecting USB jacks of a computing device is also disclosed.

7 Claims, 20 Drawing Sheets

(56) References Cited

U.S. PATENT DOCUMENTS

| | | | |
|---|---|---|---|
| 2007/0132733 A1* | 6/2007 | Ram | G06F 3/0227 345/163 |
| 2007/0199032 A1* | 8/2007 | Renkis | G08B 13/19615 725/105 |
| 2008/0147924 A1* | 6/2008 | Lambert | G06F 13/4072 710/62 |
| 2008/0200069 A1* | 8/2008 | Hankey | H01R 13/6276 439/607.01 |
| 2008/0244108 A1* | 10/2008 | Abramson | G06F 13/4291 710/16 |
| 2008/0297990 A1* | 12/2008 | Shiroishi | G06F 1/1616 361/679.57 |
| 2009/0055157 A1* | 2/2009 | Soffer | G06F 15/7864 703/27 |
| 2009/0240844 A1* | 9/2009 | Lee | G06F 13/385 710/16 |
| 2009/0294792 A1* | 12/2009 | Lee | G06K 19/07745 257/99 |
| 2010/0007456 A1* | 1/2010 | Joehren | H01F 17/0033 336/200 |
| 2010/0153737 A1* | 6/2010 | Jayet | G06F 21/34 713/186 |
| 2010/0261529 A1* | 10/2010 | Bleich | G07F 17/32 463/36 |
| 2011/0022748 A1* | 1/2011 | Edwards | A61B 1/00105 710/63 |
| 2011/0022769 A1* | 1/2011 | Hung | G06F 13/102 710/313 |
| 2011/0179405 A1* | 7/2011 | Dicks | G06F 8/61 717/168 |
| 2011/0208611 A1* | 8/2011 | Campbell | G06Q 10/10 705/26.25 |
| 2011/0208963 A1* | 8/2011 | Soffer | G06F 3/023 713/168 |
| 2011/0265156 A1* | 10/2011 | Bombay | G06F 21/34 726/5 |
| 2012/0023422 A1* | 1/2012 | Biton | G06K 19/07703 715/764 |
| 2012/0042099 A1* | 2/2012 | Wong | G06F 21/44 710/9 |
| 2012/0047368 A1* | 2/2012 | Chinn | G06F 21/31 713/175 |
| 2012/0102156 A1* | 4/2012 | Kang | G06F 9/45558 709/219 |
| 2012/0295488 A1* | 11/2012 | Geng | H01R 31/06 439/660 |
| 2013/0167226 A1* | 6/2013 | Lin | H04M 1/0256 726/19 |
| 2013/0173836 A1* | 7/2013 | Li | G06F 13/385 710/311 |
| 2013/0222609 A1* | 8/2013 | Soffer | G03B 11/043 348/207.1 |
| 2013/0262889 A1* | 10/2013 | Ichimura | G06F 13/387 713/310 |
| 2014/0004728 A1* | 1/2014 | Zhou | H01R 13/635 439/131 |
| 2014/0090428 A1* | 4/2014 | Yang | E05B 37/025 70/15 |
| 2014/0109216 A1* | 4/2014 | Iversen | G06F 21/31 726/17 |
| 2014/0157839 A1* | 6/2014 | Theobald | E05B 73/0005 70/58 |
| 2014/0302709 A1* | 10/2014 | Zhao | H01R 12/57 439/519 |
| 2014/0304435 A1* | 10/2014 | Ayyagari | G06F 11/3055 710/17 |
| 2014/0308045 A1* | 10/2014 | Pederson | H04B 10/40 398/135 |
| 2014/0370729 A1* | 12/2014 | Wang | H01R 13/6471 439/108 |
| 2015/0058509 A1* | 2/2015 | Uchida | G06F 13/362 710/200 |
| 2015/0106920 A1* | 4/2015 | Li | H04L 67/1095 726/20 |
| 2015/0229073 A1* | 8/2015 | Katayanagi | H01R 13/6275 439/345 |
| 2015/0356045 A1* | 12/2015 | Soffer | G06F 13/4221 710/303 |
| 2015/0365237 A1* | 12/2015 | Soffer | G06F 21/85 726/20 |
| 2016/0050375 A1* | 2/2016 | Soffer | H04N 5/268 348/445 |
| 2016/0085451 A1* | 3/2016 | Lee-Baron | G06F 3/0619 711/113 |
| 2016/0196454 A1* | 7/2016 | Soffer | H01R 4/4809 726/16 |

* cited by examiner

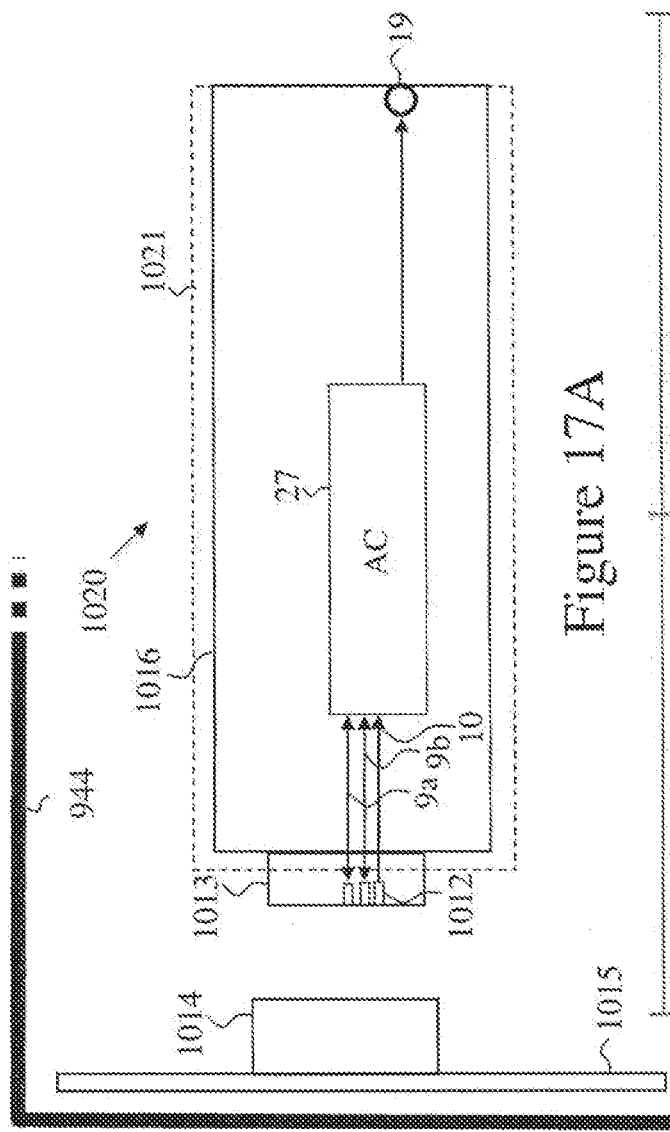
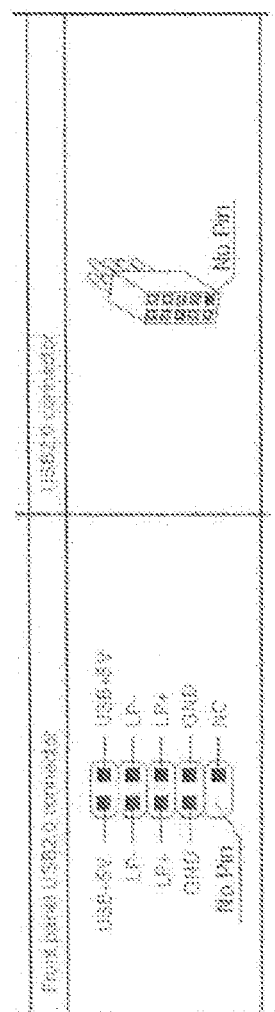
Figure 17A
Figure 17B

SECURITY KEYS ASSOCIATED WITH IDENTIFICATION OF PHYSICAL USB PROTECTION DEVICES

FIELD OF THE INVENTION

The present invention relates to methods, devices and system for enhancing computer information security by physically blocking unused USB ports with self-locking devices, or by providing USB port self-locking device with internal circuitry that qualifies and secures user peripheral device attached to the computer, and by continuously communicating with a management software application that provides real-time monitoring and warnings when any USB self-locking device is being removed or tampered.

BACKGROUND OF THE INVENTION

Generally, universal serial bus (USB) ports provide a serial bus standard for connecting devices to computers. Most modern computers include at least one, and usually a plurality of USB ports. USB ports are used to connect peripherals such as mice, keyboards, scanners, digital cameras, printers, external storage, etc.

Anyone with access to a computer's USB port can plug a portable flash drive or other mass storage device into the port and attempt to download information from the computer. Unauthorized, downloading information from the computer is a security problem. Intentional or unintentional downloading of a malicious code from plugged USB device is another critical security problem.

US Patent application 2008/0041125; USB PORT LOCKING AND BLOCKING DEVICE, to Carl Poppe, discloses a mechanical lock for USB ports.

PCT application WO2013042108; SECURITY PLUG FOR PREVENTING ACCESS TO A USB SOCKET AND SECURED USB DEVICEA, to Zeuveni Zadok, discloses a security plug for preventing access to a USB socket adapted to complete an electrical circuit when inserted into the USB socket such that its removal from the USB socket breaks the circuit and is detected by a host computer.

This plug requires adaptation of the computer side USB interface. It also deviating from modern USB standards and therefore may not be implemented in USB 2.0 or 3 interfaces.

A mechanical lock for USB port ("USB Port Lock with Blockers") is available from Kensington: Kensington Computer Products Group, A Division of ACCO Brands, 333 Twin Dolphin Drive, Sixth floor, Redwood Shores, Calif. 94065 (www.kensington.com) This method of protection requires the use of one master key (physical key) or a large set of keys for each one of the computers. It also does not offer an effective solution to the protection of USB ports that must be used for keyboard and mouse.

Another mechanical lock for USB port ("USB Port Blocker") is available from Lindy (LINDY USA, 14327 Bledsoe Rd. Athens, Ala. 35613 (http://www.lindy-usa-.com/) This method suffers from the same disadvantages as the previous mechanical lock.

Security Software that locks and manages the USB ports is available. However, as with any software based security measure, this software may be bypassed, for example if the computer is infected, or if the abuser has obtained administrator permissions. DeviceLock® manufactured by DeviceLock, Inc. of San Ramon, Calif. 94583, USA provides network administrators the ability to set and enforce contextual policies for how, when, where to, and by whom data can or cannot be moved to or from company laptops or desktop PCs via devices like phones, digital cameras, USB sticks, CD/DVD-R, tablets, printers or MP3 players. Administrators can control which users or groups can access USB and other removable and Plug-and-Play devices. Devices can be set in read-only mode while controlling access to them depending on the time of day and day of the week.

For example, USB flash dive control software may be downloaded from http://www.softpedia.com/get/System/System-Miscellaneous/USB-Port-Blocker.shtml USB blocker software may also be obtained from iSM—Institut für System-Management, Oldendorfer Str. 12, 18147 Rostock, Germany (http://www.usb-blocker.com/)

U.S. application Ser. No. 937,581/13 to the same inventor, now abandoned but published as U.S. Patent Publication 2015/0020189, titled "electro-mechanic USB locking device" depicts an electromechanical USB port protection device capable of mechanically block unused USB port, thus preventing the connection of any USB device to that port. Removal of the device requires electrically energizing the lock using security code. Security software provides scalable and secure centralized keys management. The device provides clear and continuous user visual indications when device is secure. Device derivative secures USB cable to the computer USB port.

U.S. Pat. No. 8,869,308 to the same inventor; titled "Computer motherboard having peripheral security functions", discloses a secure motherboard for a computer, wherein each user accessible peripheral port is protected by hardware based peripheral protection circuitry soldered to the motherboard. The protection circuitry provides security functions decreasing the vulnerability of the computer to data theft. User input ports such as keyboard and mouse peripheral ports are coupled to the computer through a security function that enforce unidirectional data flow only from the user input devices to the computer. This protection method is not easy to implement outside the manufacturing plant.

U.S. application Ser. No. 14/306,352 to the same inventor, now abandoned but published as U.S. Patent Publication 2015/0365237, titled "USB security gateway", discloses a USB gateway connected to a plurality of host computer shaving a USBdevice port connect to a peripheral device; and a security circuitry. The security circuitry comprises: a pre-qualification microcontroller; a mode select switch connected to the peripheral device port and selectively connecting it to one of: the pre-qualification microcontroller; or to a host selector switch that switches among the plurality of connected host computers.

Additional background information may be found in the following patent application to the same inventor:

US 20140053256 User authentication device having multiple isolated host interfaces.

US 20110145451 Isolated multi-network computer system and apparatus.

US 20140015673 Secure peripheral connecting device.

US 20140019652 Secure km switch.

SUMMARY OF THE EMBODIMENTS

Mechanical USB port lockers, for example as available from Kensington and Lindy can be removed with the use of a relatively simple mechanical key. As with other mechanical keys, these locks may be defeated. The small size of a USB port may prevent the installation of a sophisticated mechanical lock. Also the use of mechanical keys is inefficient and insecure in large organizations as there is a need for a master key or a need to maintain a large set of keys matching each particular lock in each particular computer (one computer may have up to 10 locks). It also does not provide a secure solution for the authorized use of USB keyboards and mice.

In view of the security risks associated with USB devices connected to computers, and in view of the shortcoming of prior art USB protection methods and devices, there is a need for a USB port protection device and method that at least provide:

1. A One-time self-locking device that mechanically block unused USB ports thus preventing the connection of any USB device to that port;
2. Said device is capable to communicate with a software application located on the protected computer platform and/or located remotely, to monitor the presence and the integrity of each USB of; and
3. Provide clear and continuous user visual indications when device is secure.

To further leverage such security device, it is desirable that the following derivative will be provided:

Self-locking USB cable permanently attached to a filter device that filter and secure the connected user peripheral device. For example a USB locking device that only allows a connection of USB mouse or keyboard.

In exemplary embodiments, methods, devices and system for enhancing computer information security by physically blocking unused USB ports with self-locking devices, or by providing USB port self-locking device with internal circuitry that qualifies and secures user peripheral device attached to the computer, and by continuously communicating with a management software application that provides real-time monitoring and warnings when any USB self-locking device is being removed or tampered. The self-locking devices use a spring loaded teeth in the USB plug that lock into tab spaces in the USB jack. Visual indicator provides positive assurance when all ports are secure. Each self-locking devices include a security circuit which is uniquely paired with the protected port. Some self-locking devices include data filters that only enable connecting authorized peripheral devices.

It is an aspect of the current invention to provide a method, an apparatus and a system that enhance computer information security through physically blocking unused USB ports with an electronic self-locking device. Some embodiments of the current invention provide a USB port self-locking device with internal circuitry that qualifies and secures the attached user peripheral device. Other embodiments of the current invention combine multiple self-locking USB devices installed in multiple computers to continuously communicating with a management software application that provides real-time monitoring and warnings when device is being removed.

It is an aspect of the current invention to provide a self-locking USB protection plug device comprising: a rugged body shaped and sized to be inserted into a standard USB jack of a protected computing apparatus, wherein said rugged body is having at least one spring, said at least one spring is having a locking tooth sized and shaped lock inside a shielding tab holes of said standard USB jack; a faceplate attached to said body, said faceplate is larger than said standard USB jack to prevent an attempt to insert a thin tool between the inserted self-locking USB plug body and the USB jack; a printed circuit board assembly, housed within said body, said printed circuit board assembly is having contacts for electronically interfacing with said protected computing apparatus via said standard USB jack; an LED indicator attached to said printed circuit board assembly and visible on said faceplate; and an active authentication chip attached to said printed circuit board assembly, wherein said active authentication chip is capable of communicating with, and authenticating in front of a security software executed by said protected computing apparatus, and wherein said active authentication chip is capable of causing said LED indicator to indicate that said USB jack is securely protected by an authenticated USB protection plug device.

In some embodiments the body is made of metal, said faceplate is made of metal, and said faceplate is welded to said body.

In some embodiments at least one spring is a leaf spring, wherein said at least one leaf spring is bent to form a corresponding locking tooth.

In some embodiments the at least one leaf spring is part of said body made of metal.

In some embodiments the metal body is having two leaf springs, each of said two leaf springs is bent to form a corresponding locking tooth.

In some embodiments attempting to pull the self-locking USB protection plug device out of said standard USB jack causes said leaf springs to be bent and further lock the USB protection plug to said standard USB jack.

In some embodiments the active authentication chip is capable of causing said LED indicator to indicate that said USB jack is not securely protected by an authenticated USB protection plug device.

In some embodiments the active authentication chip is capable of causing said LED indicator to indicate that at least one USB jack in said protected computing apparatus is not securely protected.

In some embodiments the faceplate secures in place a cover plates for covering at least one USB jack adjacent to said standard USB jack into which the self-locking USB protection plug device was inserted.

It is another aspect of the current invention to provide a self-locking Human Interface Device (HID) filter device comprising: at least one permanently attachable self-locking USB plug having at least one locking tooth to permanently connect said at least one permanently attachable self-locking USB plug to a USB jack of a protected computing apparatus; a USB hub having an upstream port coupled to said self-locking USB plug and having at least a first downstream port and a second downstream port; an authentication chip coupled to said first downstream port of said USB hub, to enable positive authentication of the self-locking filter device by software installed at said protected computing apparatus; a USB HID Device Emulator function, for emulating a standard USB keyboard and mouse, coupled to said second downstream port of said USB hub; at least one USB device port, for connecting a user HID device to the HID filter; and at least one USB Host Emulator, for emulating USB host stack, coupled to said USB device port on one side and to said USB HID Device Emulator function on the other side.

In some embodiments at least two of said: authentication chip; said USB hub; and said USB HID Device Emulator function are integrated into a single chip.

In some embodiments the self-locking HID filter further comprises a physical unidirectional data flow enforcing device connected between said USB HID Device Emulator function and said USB Host Emulator allowing data flow only from said HID user device to said protected computing apparatus.

In some embodiments the self-locking HID filter further comprises: a housing, for housing: said USB hub, said authentication chip, USB Device Emulator function, said at least one USB Host Emulator, and said at least one USB device port; and a tamper evident sticker, attached to said housing for indicating tampering attempt of said housing.

In some embodiments at least one permanently attachable self-locking USB plug is integrated into said housing.

In some embodiments the self-locking HID filter further comprises a second permanently attachable self-locking USB plug, wherein said second permanently attachable self-locking USB plug is integrated into said housing.

In some embodiments the self-locking HID filter further comprises a cable connecting said housing to said at least one permanently attachable self-locking USB plug.

It is an aspect of the current invention to provide a self-locking peripheral filter device comprising: a permanently attachable self-locking USB plug having at least one locking tooth to connect to a USB jack of a protected computing device;

a USB hub having a upstream port coupled to said self-locking USB plug and having al least a first downstream port and a second downstream port; an authentication chip coupled to said first downstream port of said the USB hub to enable positive authentication of the self-locking peripheral filter device by software installed at said protected computing device; at least one USB device port for connecting a user device; a Qualification Microcontroller having host USB port for USB enumeration and qualification of a user device coupled to said at least one USB device port; and a USB mode select switch, controlled by the Qualification Microcontroller, coupled to USB device port, wherein said USB mode select switch couples said USB device port to said USB device port of said Qualification Microcontroller before said user device is qualified, and couples said USB device port to said and a second downstream port of said USB hub when said user device was qualified.

In some embodiments the self-locking peripheral filter further comprises at least a first LED indicator for indicating at least one of: qualification status of said user device, and authentication status of said authentication chip.

In some embodiments at least two of: said USB hub; said authentication chip; said Qualification Microcontroller; and said USB mode select switch are integrated into a single electronic chip.

In some embodiments the self-locking peripheral filter further comprises:

a housing, for housing: said USB hub; said authentication chip; said at least one USB device port; said a Qualification Microcontroller; and said a USB mode select switch; and a tamper evident sticker, attached to said housing for indicating tampering attempt of said housing.

It is another aspect of the current invention to provide a method of protecting USB jacks of a computing device comprising: obtaining identification of at least one USB protection device; entering said identification of said at least one USB protection device into the organization database; installing a security application in a protected computing device having a housing and at least one USB jack exposed on said housing; loading security key associated with said identification of said at least one USB protection device from said organization database to said security application in a protected computing device; inserting and permanently locking said at least one USB protection device into said at least one exposed USB jack; and qualifying said at least one USB protection device by said security application.

In some embodiments the steps of: obtaining identification of at least one USB protection device, entering said identification of said at least one USB protection device into the organization database, installing a security application in a protected computing device having at least one exposed USB jack, loading security key associated with said identification of said at least one USB protection device from said organization database to said security application in a protected computing device, inserting and permanently locking said at least one USB protection device into said at least one exposed USB jack, and qualifying said at least one USB protection device by said security application are repeated for all USB jacks exposed on said housing.

In some embodiments the method of protecting USB jacks of a computing device further comprises: connecting said protected computing device to a centralized management system server executing a centralized security application; and logging security events detected by said at least one USB protection device on said centralized management system server.

In some embodiments the method of protecting USB jacks of a computing device of further comprises: detecting a security event by at least one of: at least one of said protection devices; and said security application; disabling all said exposed USB jacks; disabling operation of all said protection devices; and providing visual indication on said protection devices.

It is yet another aspect of the current invention to provide an internal USB protection plug device comprising: a printed circuit board assembly; a receptacle connector, soldered to said printed circuit board assembly for electronically interfacing with an internal USB port internal to a housing of a protected computer; an active authentication chip attached to said printed circuit board assembly, wherein said active authentication chip is capable of communicating with, and authenticating in front of a security software executed by said protected computing apparatus, and wherein security software is capable of generating a security event if at least one internal USB port internal to a housing of a protected computer is not protected by an authenticated internal USB protection plug device.

In some embodiments the internal USB protection plug device further comprises an LED indicator attached to said printed circuit board assembly, Wherein said active authentication chip is capable of causing said LED indicator to indicate that said USB jack is securely protected by an authenticated USB protection plug device.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Unless marked as background or art, any information disclosed herein may be viewed as being part of the current invention or its embodiments.

BRIEF DESCRIPTION OF THE OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 3:
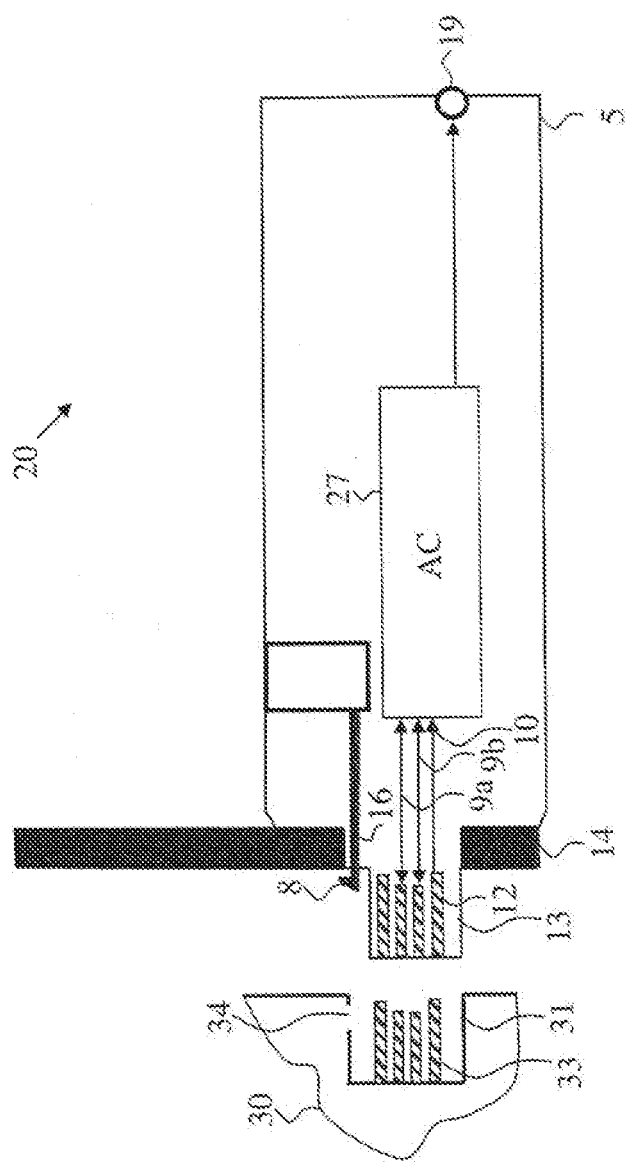

FIG. 3 schematically illustrates a high-level block-diagram of a self-locking USB security plug having an electronic authentication chip according to an exemplary method and embodiment of the present invention showing the self-locking USB security plug before it was plugged into the protected computer USB jack.

Figure 4:
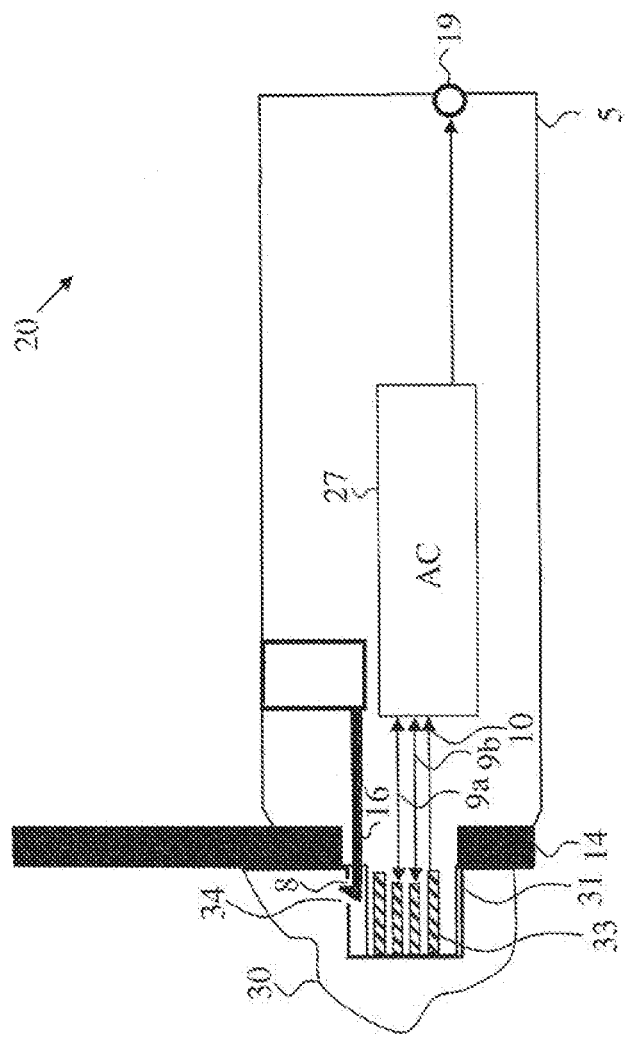

FIG. 4 schematically illustrates a high-level block-diagram of the self-locking USB security plug of FIG. 3 plugged into the protected computer USB jack.

Figure 5:
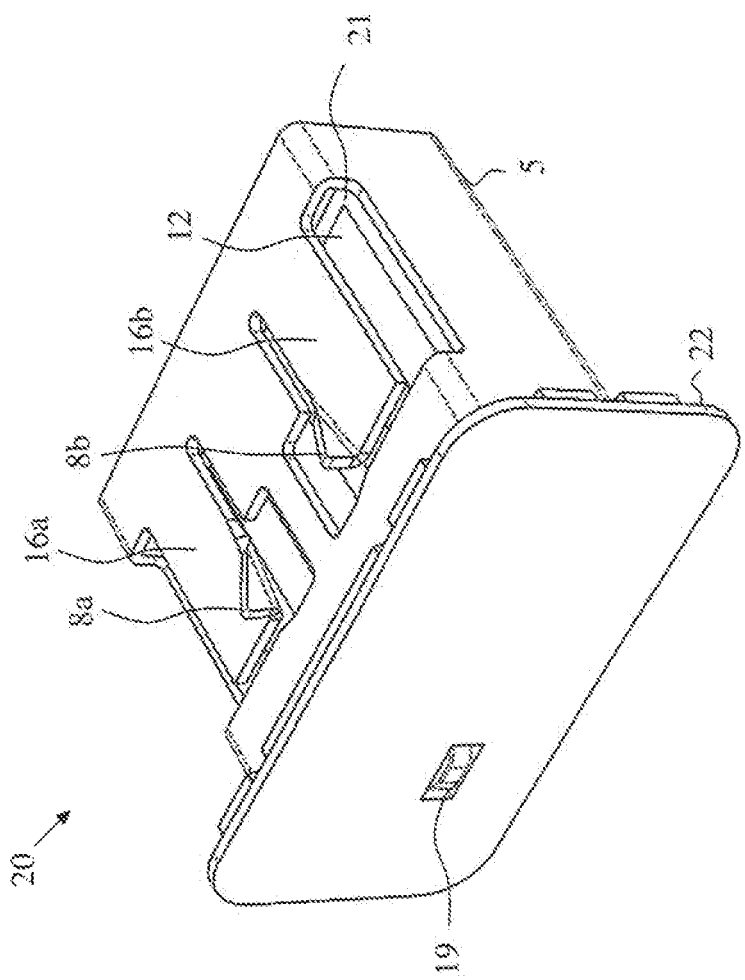

FIG. 5 schematically depicts a mechanical diagram of the self-locking USB security plug of FIGS. 3 according to an exemplary embodiment of the present invention.

Figure 6:
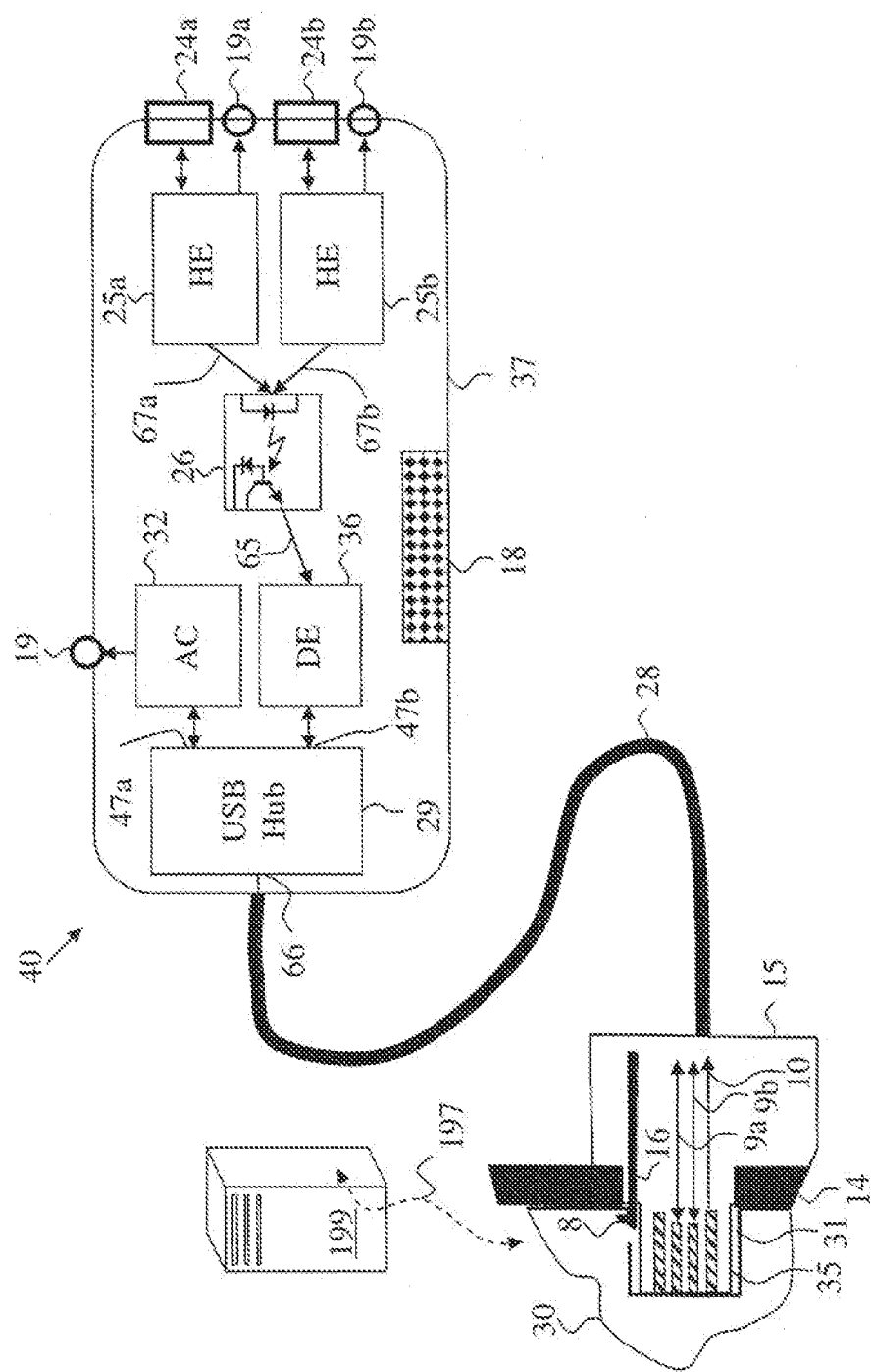

FIG. 6 schematically illustrates a high-level block-diagram of a self-locking USB Human Interface Device (HID) filter security device having a unidirectional data diode function according to another exemplary embodiment of the present invention.

Figure 7:
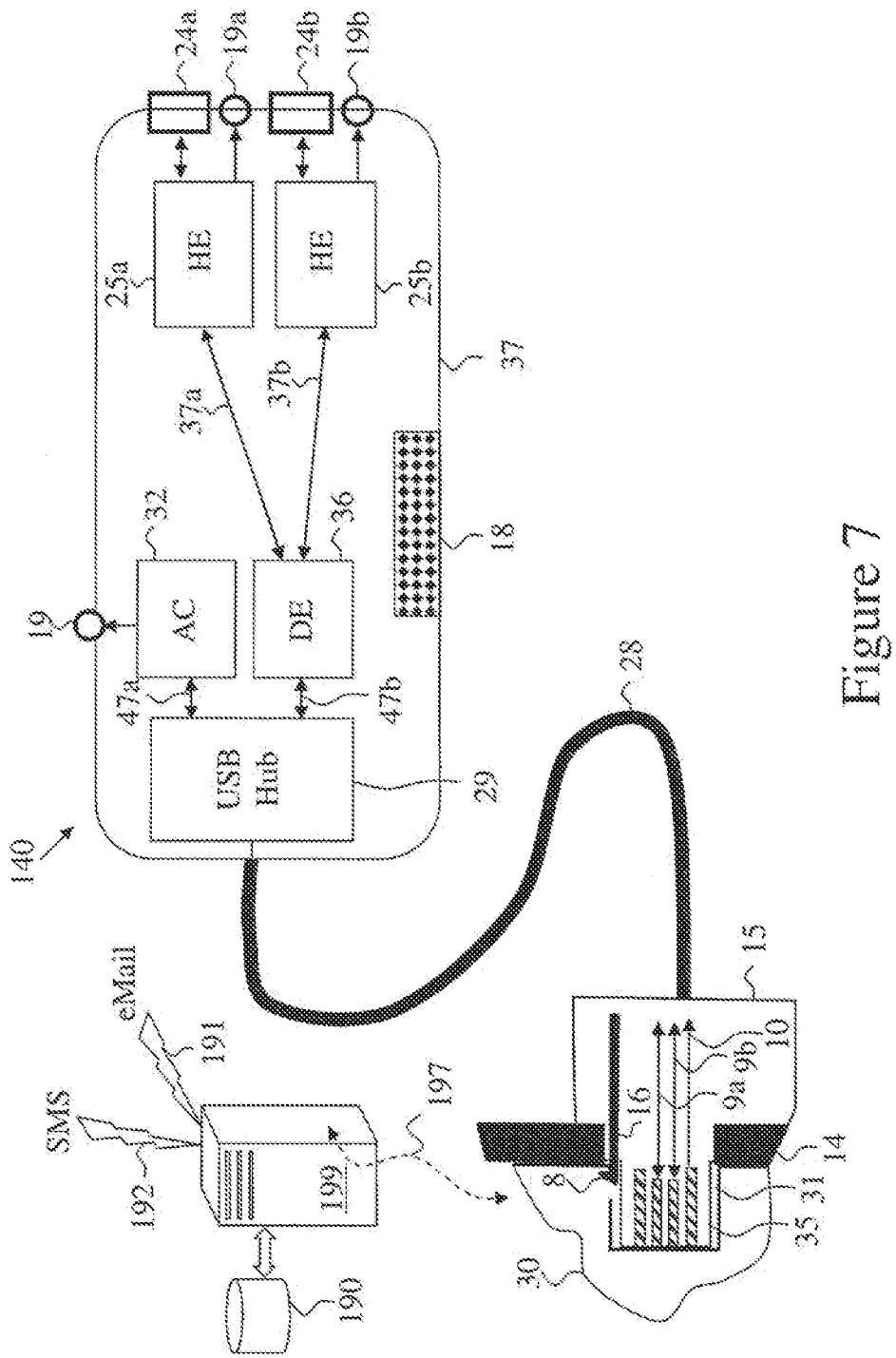

FIG. 7 schematically illustrates a high-level functional diagram of a self-locking USB HID filter not having a unidirectional data enforcing device according to another exemplary embodiment of the present invention.

Figure 8A:
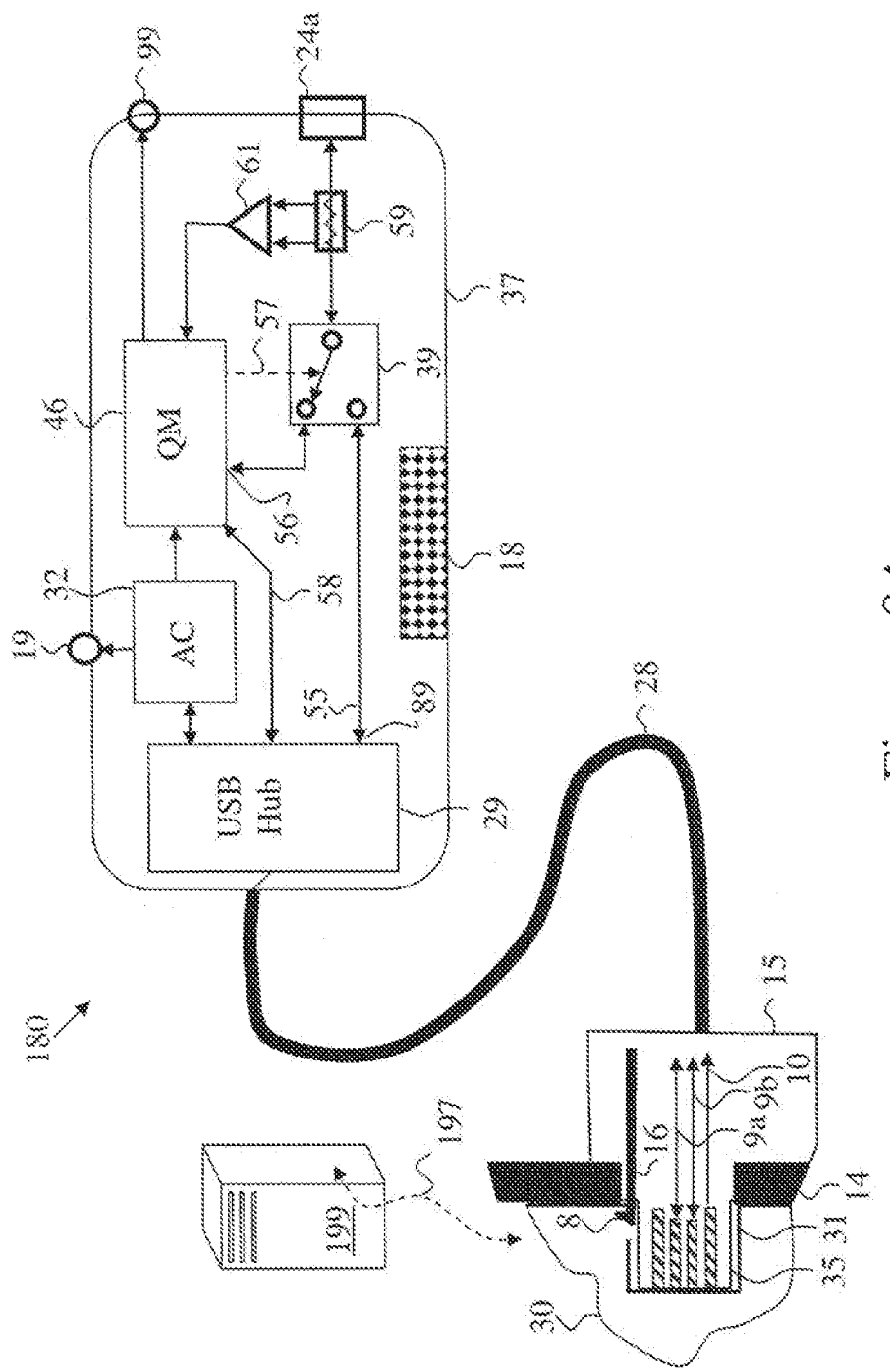

FIG. 8A schematically illustrates a high-level functional diagram of another USB security filter having a Qualification Microcontroller function according to another exemplary embodiment of the present invention.

Figure 8B:
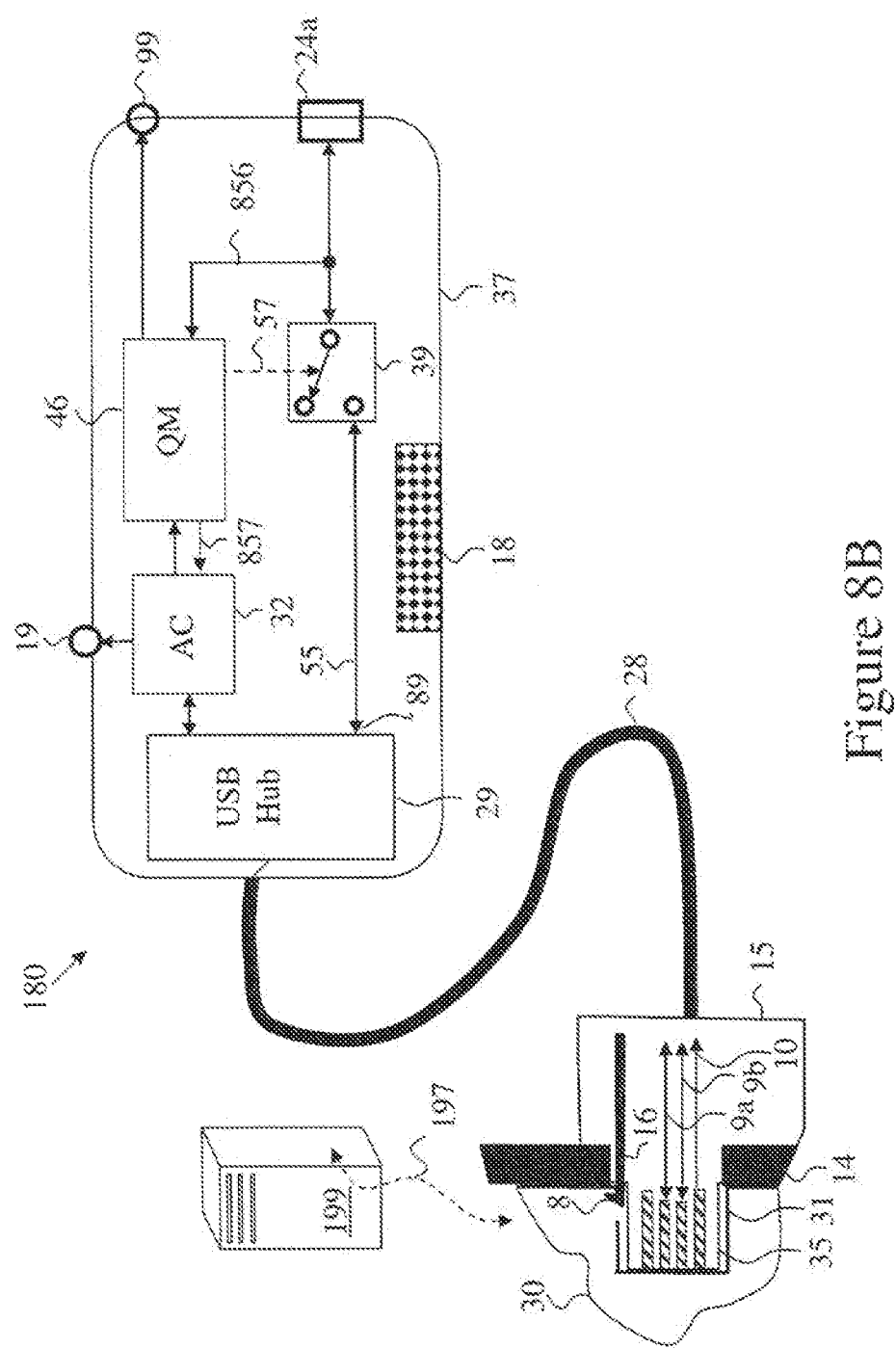

FIG. 8B schematically illustrates a high-level functional diagram of another USB security filter according to another exemplary embodiment of the present invention.

Figure 8C:
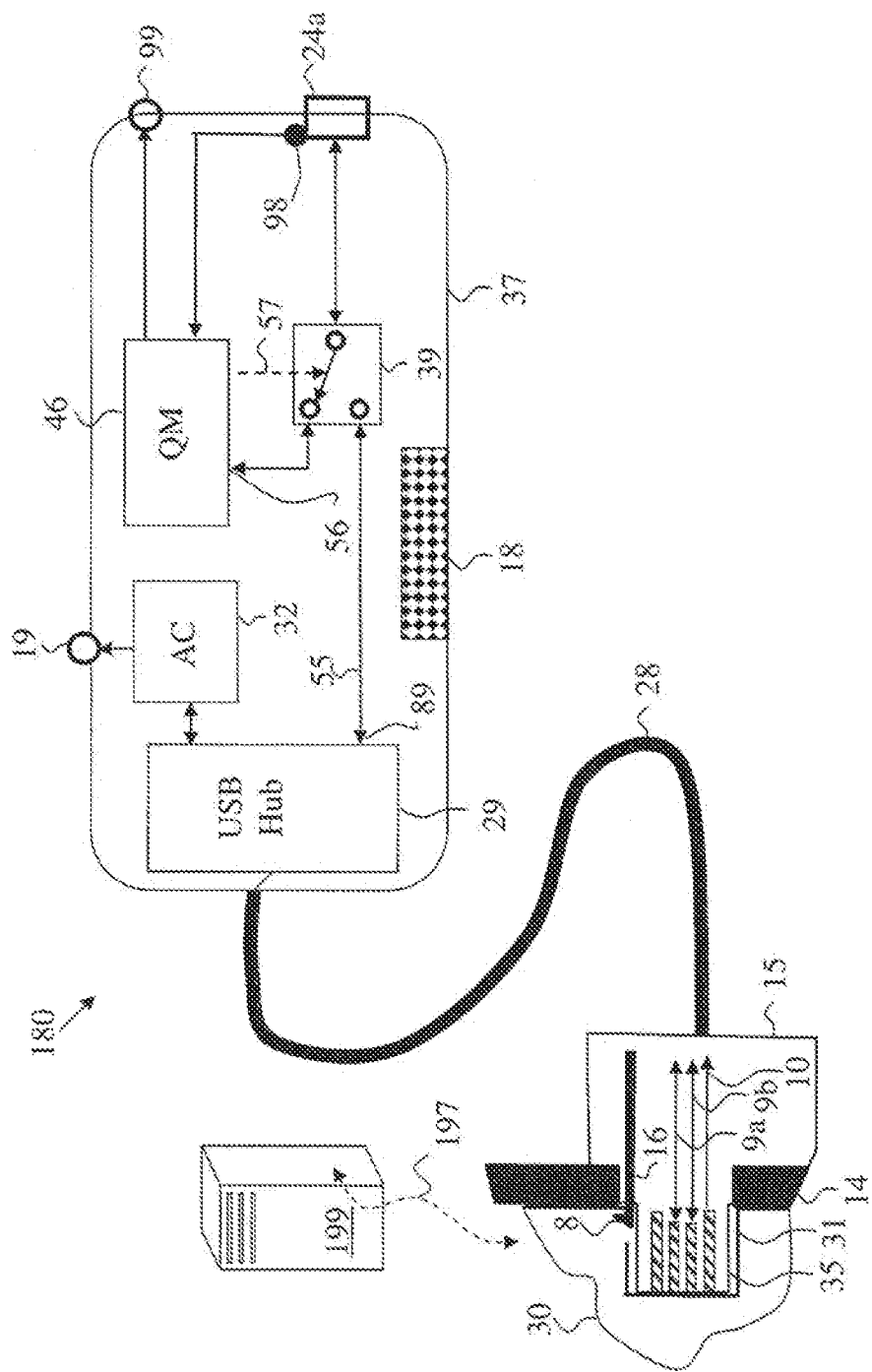

FIG. 8C schematically illustrates a high-level functional diagram of another USB security filter according to yet another exemplary embodiment of the present invention.

Figure 9A:
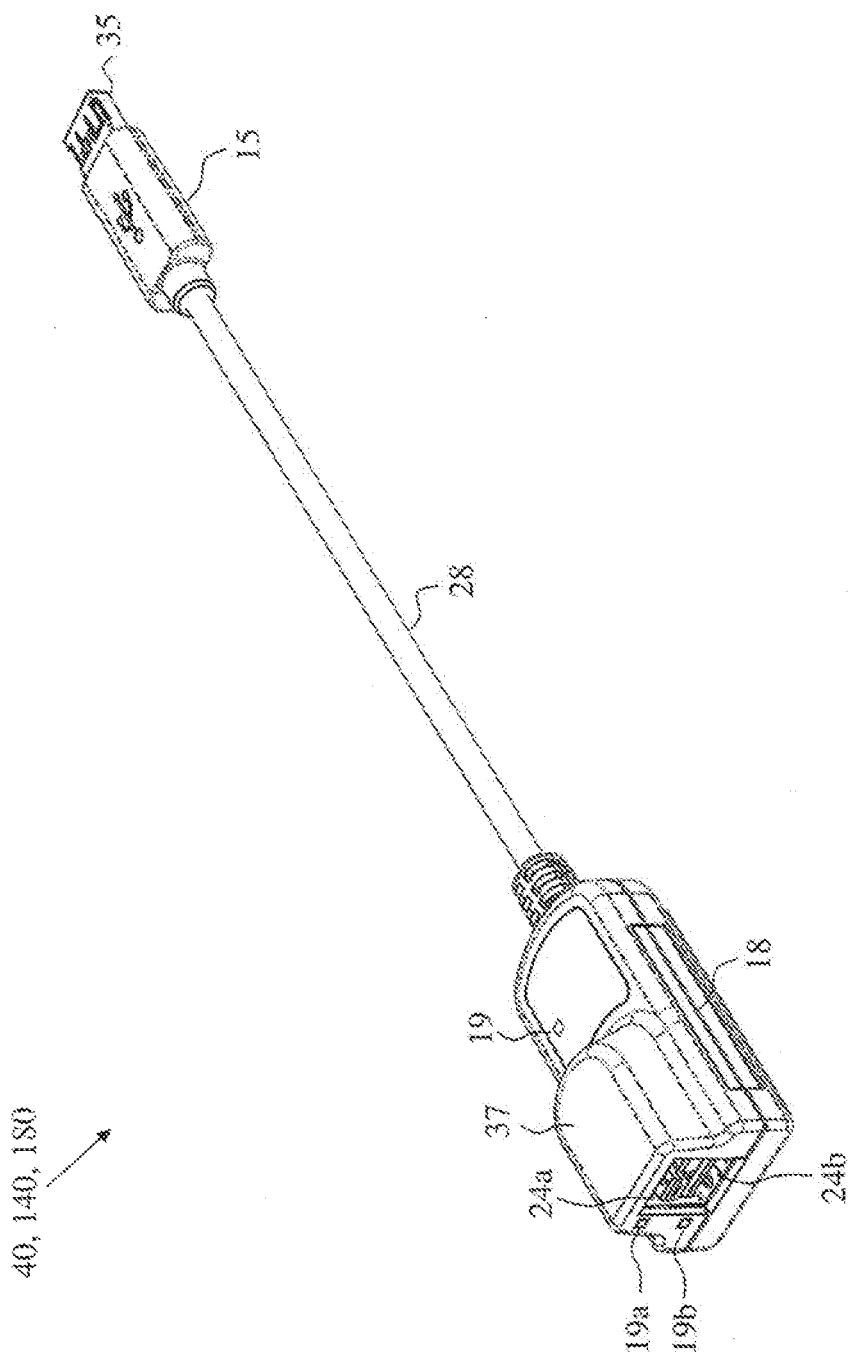

FIG. 9A schematically illustrates a mechanical diagram of the self-locking security plug shown in FIGS. 6 to 8, according to an exemplary embodiment of the present invention.

Figure 9B:
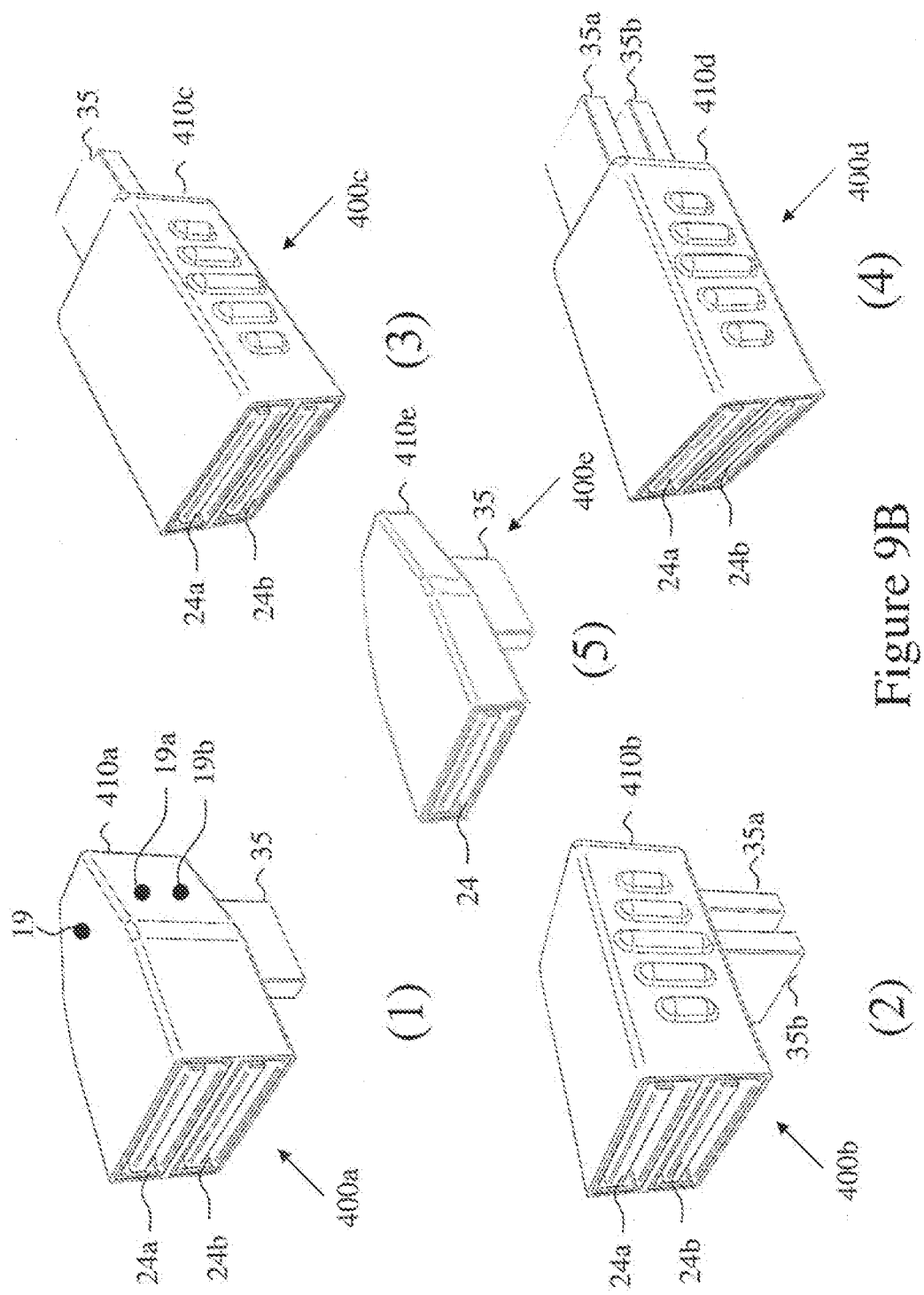

FIG. 9B schematically illustrates mechanical diagrams of self-locking security plugs according to other exemplary embodiments of the present invention.

Figure 10:
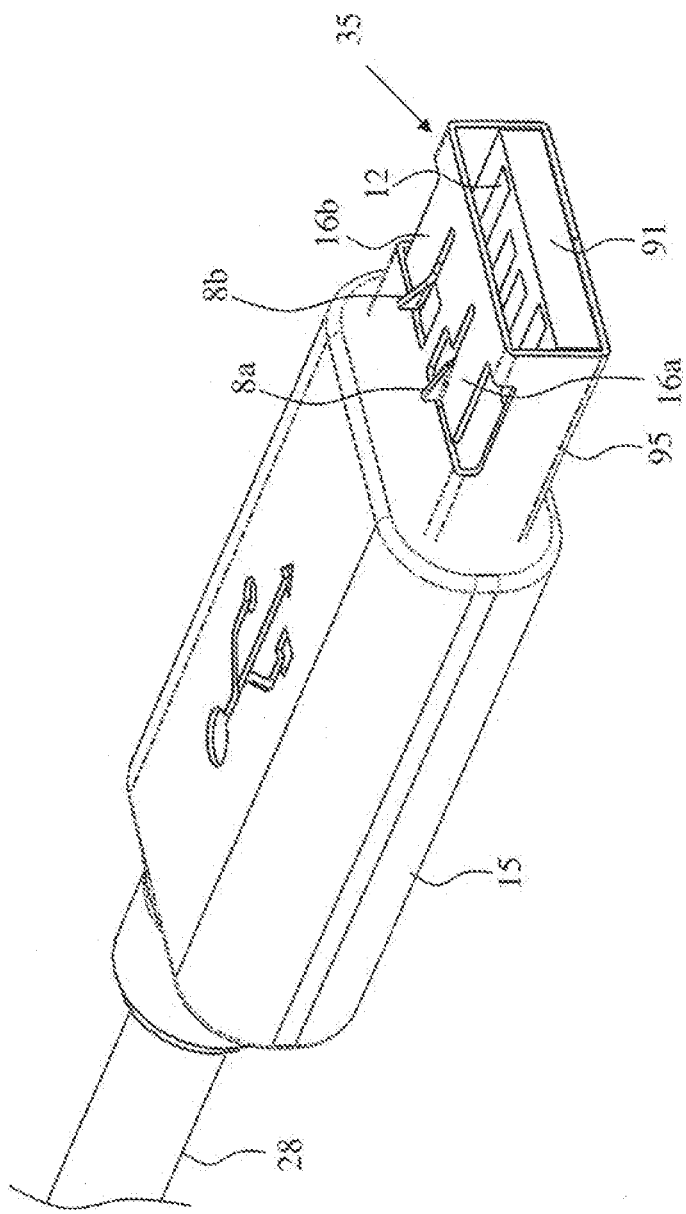

FIG. 10 schematically illustrates in greater details the self-locking USB plug of the exemplary embodiment of the current invention shown in FIG. 9 above.

Figure 11:
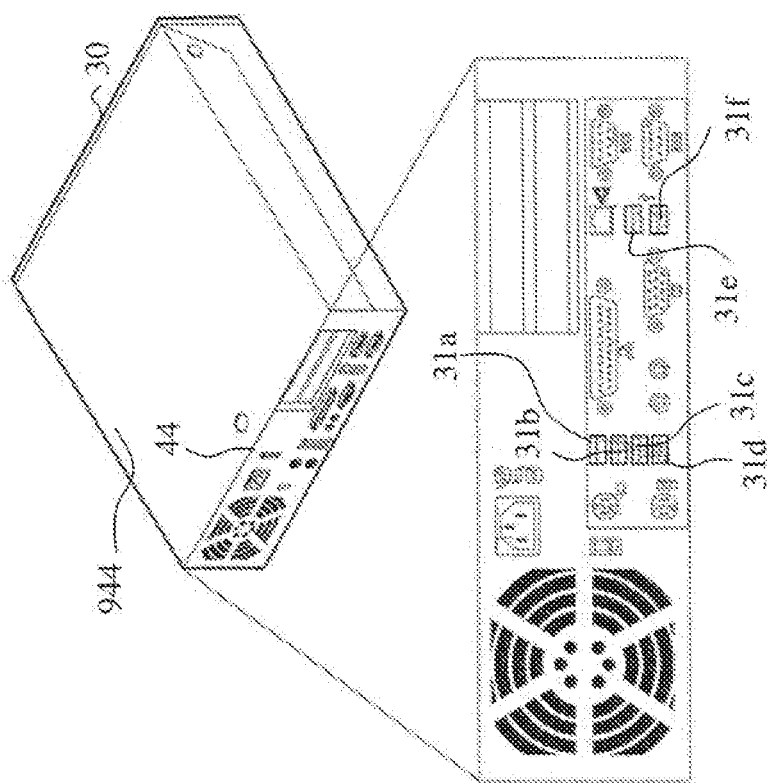

FIG. 11 schematically illustrates a computer rear panel, having exposed USB jacks which may be used to plug various USB devices and therefore regarded as security vulnerability as used in the prior art.

Figure 12:
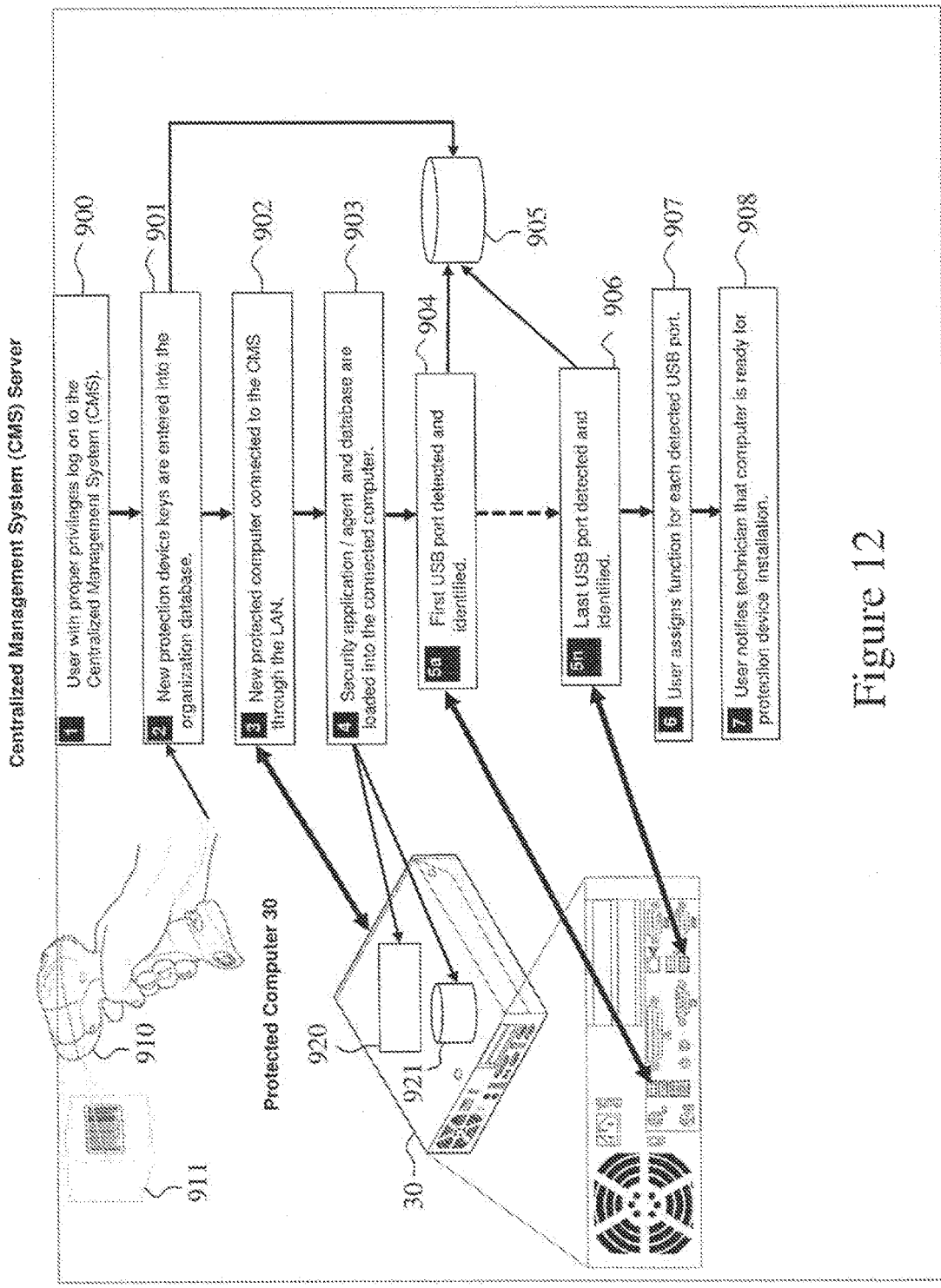

FIG. 12 schematically illustrates a simplified flow-chart diagram of the preparations phase before protecting an unprotected computer according to other exemplary embodiments of the present invention.

Figure 13:
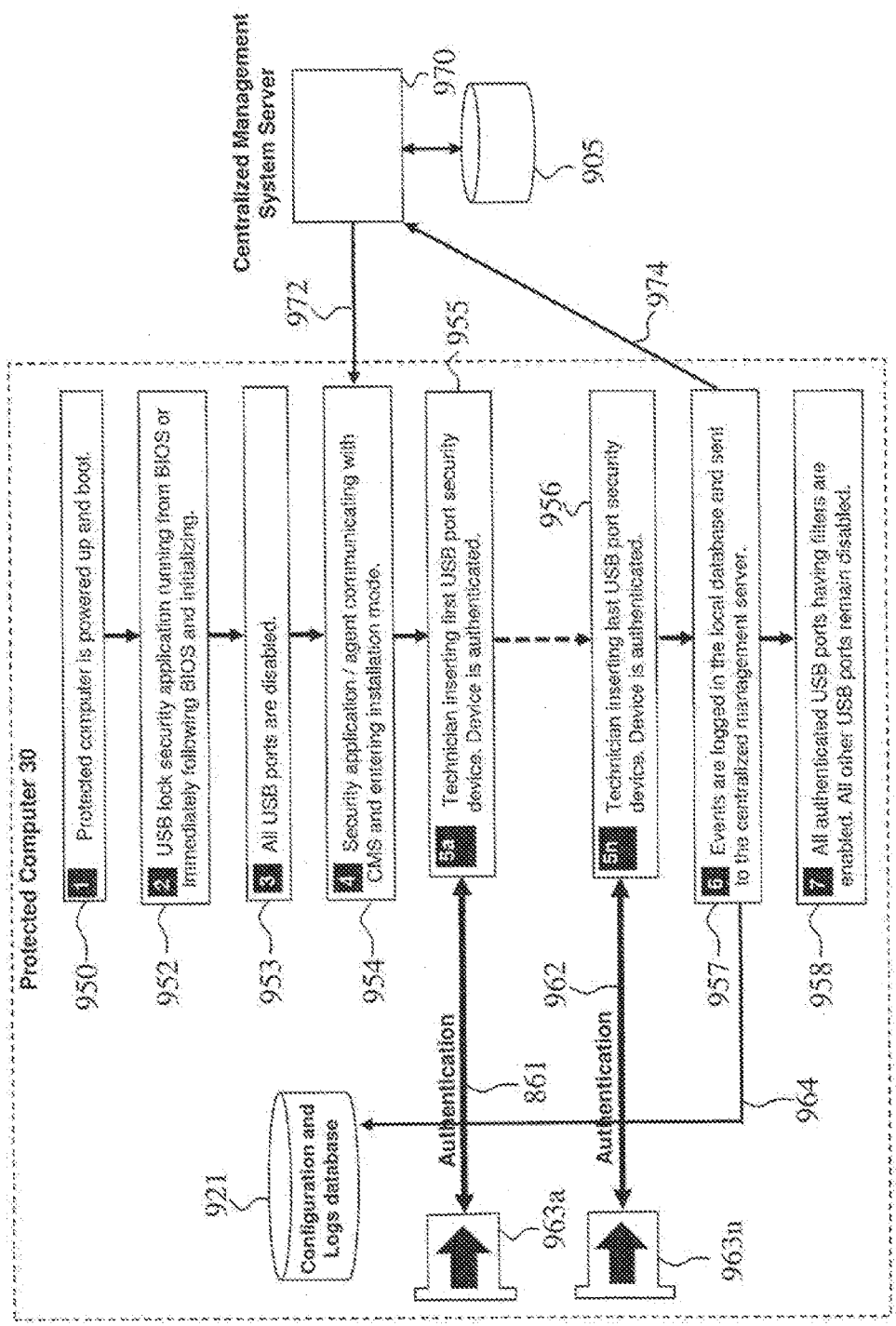

FIG. 13 schematically illustrates a simplified flow-chart diagram of the USB protection devices installation phase on the unprotected computer according to other exemplary embodiments of the present invention.

Figure 14:
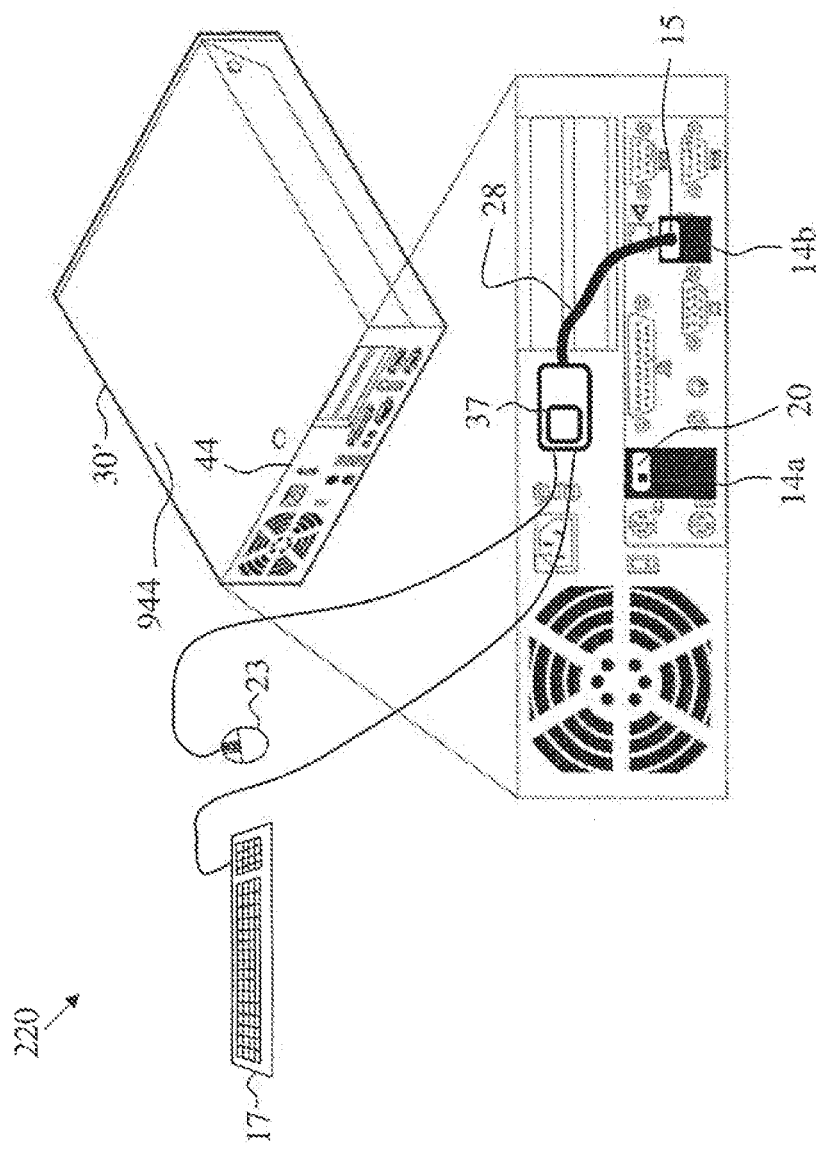

FIG. 14 schematically illustrates the same computer of FIGS. 11 to 13 having self-locking USB protection devices of the current invention installed according to an exemplary embodiment of the present invention.

Figure 15:
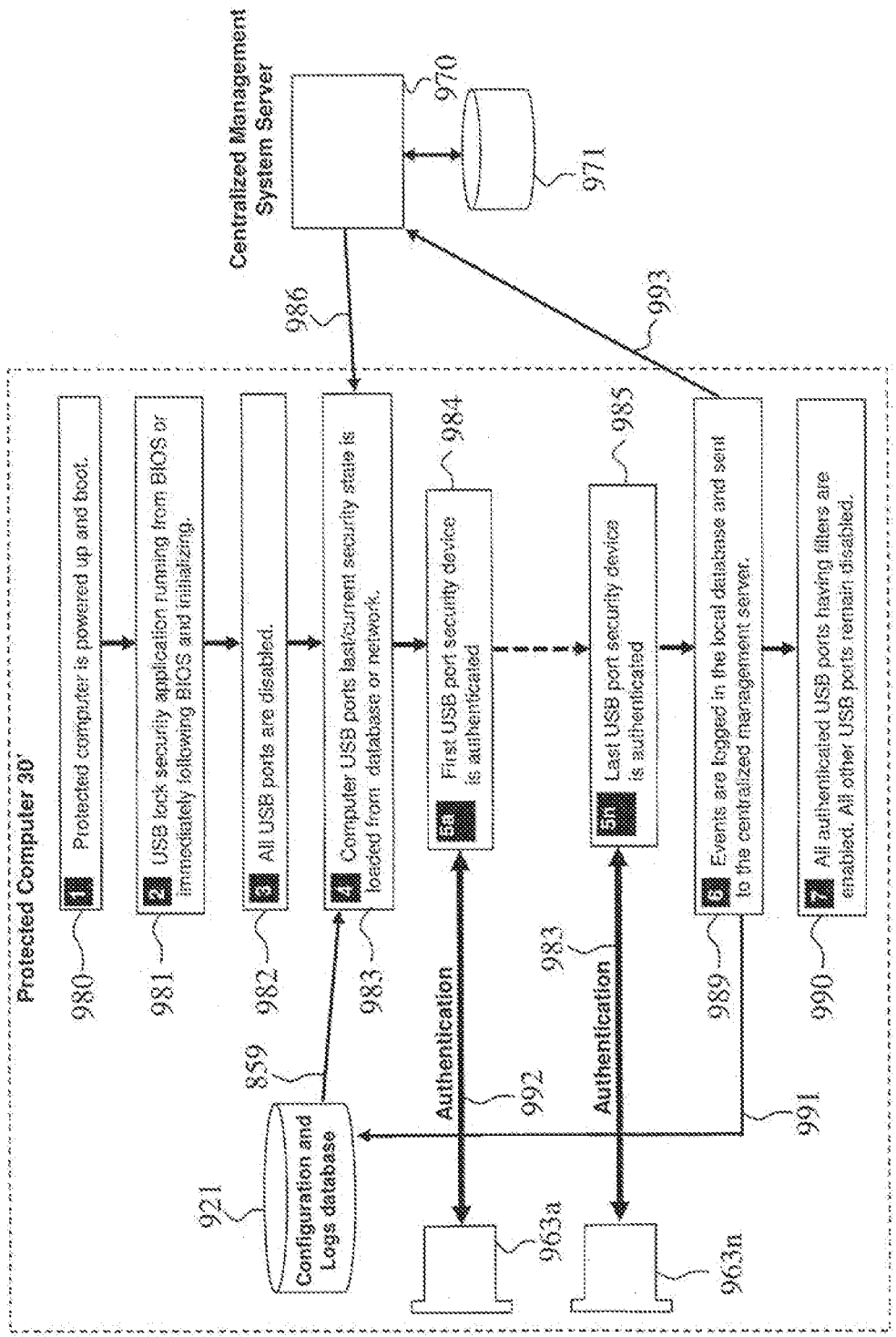

FIG. 15 schematically illustrates the flow-diagram of protected computer initialization with pre-installed USB protection devices according to an exemplary embodiment of the current invention.

Figure 16:
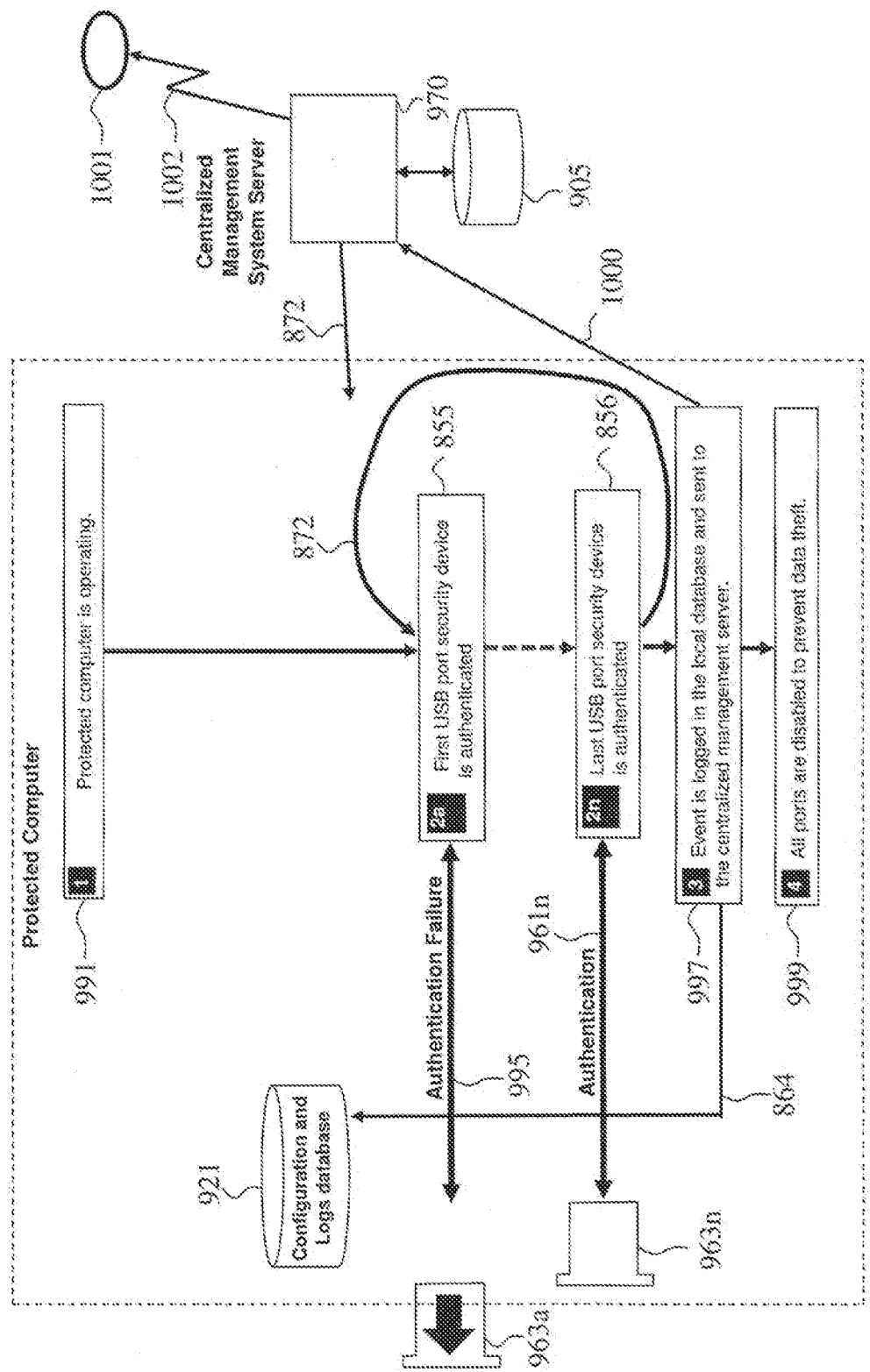

FIG. 16 schematically illustrates a simplified flow-chart diagram of the protected computer shown in FIGS. 13 to 15 above, being tampered while operating according to an exemplary embodiment of the current invention.

FIG. 17A schematically illustrates a high-level block-diagram of an internal USB security plug according to yet another exemplary embodiment of the present invention.

FIG. 17B schematically illustrates a typical USB male and a receptacle connector used with the internal USB security plug of FIG. 17A.

DETAILED DESCRIPTION OF THE DRAWINGS

Before explaining at least one embodiment of the invention in detail, it is to be understood that the invention is not necessarily limited in its application to the details set forth in the following description or exemplified by the examples. The invention is capable of other embodiments or of being practiced or carried out in various ways.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

In discussion of the various figures described herein below, like numbers refer to like parts. The drawings, and specifically the block diagrams are generally not to scale. For clarity, non-essential elements may have been omitted from some of the drawing.

To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, or the like) or multiple pieces of hardware. Similarly, the programs may be stand alone programs, may be incorporated as subroutines in an operating system, may be functions in an installed software package, and the like.

Figure 1:
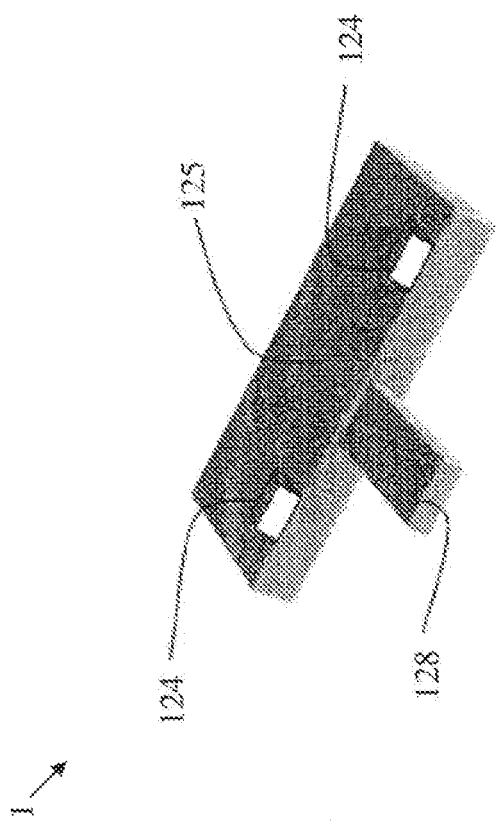
FIG. 1 illustrates a prior-art USB security plug for preventing access to the USB port based on PCT application WO 2013/042108 A1.

FIG. 1 illustrates a prior-art USB security plug for preventing access to the USB port based on PCT application WO 2013/042108 A1. This prior-art security plug device 1 is used to prevent access to USB port.

The security plug 1 has a planar body portion dimensioned for insertion into the frame of the USB jack (not shown in this figure). The body portion may also be dimensioned such that an end surface thereof is flush with an outer edge of the USB jack frame when the plug is fully inserted therein. At least one prong 124 is supported by a major surface 125 of the body portion for engaging a corresponding aperture in the USB jack frame whereby an edge of the aperture engages the prong 124 and impedes removal of the plug from the socket. A frangible tab 128 fixed to the end surface of the plug and adapted for easy removal therefrom after insertion of the plug into the USB jack. In one embodiment, the frangible tab 128 is adapted to be fractured from the body portion upon attempting to remove the plug from the socket leaving a facture mark. This both prevents removal while also providing an immediate visual indication that the plug has been tampered with.

Also described in this patent application are security functions that enable software detection of the plug presence through software running on the host computer. Between the VBUS and Ground connections (pins 1 and 4 of the USB plug) there is connected a resistor R (not shown in this figure) of sufficiently high value e.g. 100 KOhm to impose little current drain. Software in the host computer monitors the current flowing between VBUS and Ground so as to detect whether the security plug is connected or removed as a function of current flow. Specifically, any status in the connection or disconnection of the security plug while the computer is operating can be detected in this manner. In order to provide an additional layer of security that prevents tampering while the computer is switched off, a memory device storing a unique ID may be connected across the data pins 2 and 3 so as to allow the host computer to identify the device. The host computer monitors the USB ports and detects when a device is removed or inserted and uses the ID to establish the ID of the device. The user is then prompted to enter an authorization code that is matched to a database of authorized users stored in the computer in order to determine whether the user is authorized to remove or insert the identified device and take precautionary or evasive action if necessary.

Figure 2:
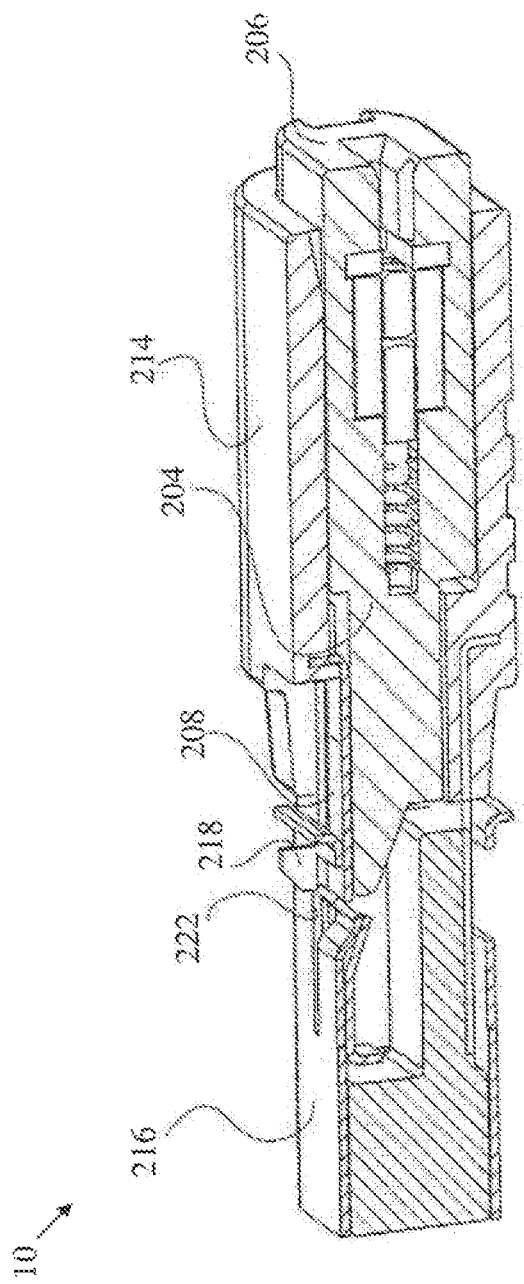
FIG. 2 illustrates another prior-art device a mechanical USB locking plug described in US Patent application US 2008/0041125 A1.

FIG. 2 illustrates a cross-sectional view of another prior-art mechanical USB locking plug device described in US Patent application US 2008/0041125 A1.

A lock 10 with a housing 214 mounted onto a retaining sheath, which is insertable to a USB port (not shown in this figure). Locking member 208 is pivotally connected to the rear end of retaining sheath. Locking member 208 is provided with two protrusions 218, which correspond to standard openings in a USB port. Locking member 208 has a bent, preformed shape, such that in the absence of external forces it runs diagonally; its front end is farther inward than its back end. Lock 10 further includes lock button 206 which protrudes from the rear end of housing 214. Lock button 206 is depressible by a user to lock the lock 10. Lock button 206 is connected to linear cam 204, which pivots locking member 208 by cooperating with the ramped camming surface of locking member 208.

While this prior art device solves the physical security problem is suffers from several disadvantages:
1. There is no way for the connected computer to monitor the security of its ports. This apparatus cannot be monitored through software.
2. The use of mechanical keys is not secure. Attacker may gain access to the matching key or even similar key and use it to remove this device.
3. Keys management—If keys are identical across the organization then there will be a security threat that one key will find its way to the attacker. If keys are different then it is very difficult for large organization to manage and match these keys.

FIG. 3 schematically illustrates a high-level block-diagram of a self-locking USB security plug having an electronic authentication chip according to an exemplary method and embodiment of the present invention showing the self-locking USB security plug before it was plugged into the protected computer USB jack.

In this embodiment, the USB security plug 20 having an enclosure 5 has a USB plug 13 designed to fit standard USB jack 31 of host device 30 (only part of which is seen in this figure) such as the one illustrated to at the left side. USB jack 33 may be any open and unused USB port in host PC, laptop, docking station, appliance, server etc. (item 30). USB jack 31 may be USB 2.0, USB 3.x, Micro USB etc. Electrical contacts 12 of USB security plug 20 are arranged to touch the electrical contacts 33 of USB jack 31.

Authentication chip 27 is connected to the USB plug contacts 12 through lines 9a and 9b to enable software loaded on protected computer 30 to positively authenticate the USB security plug 20. Power required for the Authentication chip 27 and other circuitry is received from host computer USB contacts 33 via plug contacts 12 and line 10. Power is 5 VDC (5 Volts Direct Current) as defined in the applicable USB standard. Authentication chip 27 also drives LED 19 visible on the exposes surface of enclosure 5 to provide user indications of device status. Preferably LED 19 is bi-color LED to provide blinking green illumination when port is secured and steady or blinking red illumination when port in not secured.

LED 19 may serve one or few of the following several purposes:
- During the installation these LEDs provides an essential indication for the installer that the install plug is fully inserted and authenticated by the management system. The electromechanical construction of the plug is such that the short data leads in the plug make contact (and thus enable authentication) only after the mechanical locking teeth were engaged.
- At one glance the installer can see that all USB ports are protected. The management system causes LED 19 of all USB security plug to blink if even one USB port is unprotected (for example: exposed or having unauthenticated plug in it).
- While computer is in use, the user may verify that all USB ports are plugged and no plug is missing, replaced, fail to authenticate, tempered with, or misused (an unauthorized use will be detailed in connection with FIGS. 6-9). The management system causes LED 19 of all USB security plug to blink if even one USB port is unprotected (for example: exposed, unauthenticated, or reported a security event as would be detailed later).

To protect against insertion of a fake USB security plug, chip 27 provides strong authentication by authentication process against the security software installed in the protected host (as will be detailed for example in FIGS. 12, 15 and 16).

The authentication process also protects against removal of the USB plug and inserting another (even a genuine) plug. Since each plug has unique authentication properties, any other plug purchased from the same manufacturer, or made by someone else would not correctly authenticate unless it was issued by the security organization (The configuration, authentication an issuing of the USB plugs is similar to the process of issuing smart-cards or tokens to users. An exemplary process is seen in FIGS. 12, 15 and 16).

Optionally, a security software installed on the host, periodically monitors the presence and authenticity of all the plugs that were installed in the host. If one or more of the plugs is missing or fail to authenticate, the security software installed on the host may take on of few corrective actions such as:

Halting the operation of the host.
Issuing local warning statement.
Sending warning statement to a remote security server or other remote locations via SMS or e-mail.
Creating a security event entry in a security log file.
Disabling the unsecure USB port.
Disabling all the USB port.
Causing available plugs so show un-authenticated status, for example by red blinking of their LED 19.

Optionally, the installed plug (or plugs) monitors the existence and integrity of the security software installed on the host by periodically attempting authentication. If the software installed on the host fails to authenticate the plug, the plug may take one or more corrective actions such as:

Showing un-authenticated status, for example by red blinking of its LED 19.
Start emulating a keyboard and typing warning message text—this will prevent normal usage of that computer.

A centralized management system, for example executed on Centralized Security Management Server 199 seen in FIG. 7, enables the following operation by authorized personnel:

1. Accepting new USB security devices into the organization.
2. Running an installation application that pairs specific USB security devices with specific computers/ports.
3. Removing USB security devices from the organization.
4. Removing USB security devices from specific computer/ports to be reused later.

These management functions allow the organization to fully control the current pool of USB security plugs and to track where, by who and when they were installed. Any unauthorized change may be used to trigger an alarm.

Spring 16 connected to self-locking teeth 8 enables one-time locking of the USB security plug 5 inside the protected computer 30 USB jack 31. One or more teeth 8 are shaped to enable one-time insertion by force into the one or more grounding tab spaces 34 in the mating jack 31. Spring 16 may be a torsion spring, leaf spring or any other type of elastic component. Preferably the locking mechanism comprises of two teeth formed as part of the metal body of the enclosure 5 of the USB security plug 20. Note that in the preferred embodiment of the current invention the whole electronic circuitry is contained inside the USB contacts plate 21 as will be shown in FIG. 5.

Enclosure 5 is designed to withstand mechanical tampering and therefore it is preferably made from material such as strong stainless steel or Phosphor Bronze formed metal sheet.

One or more cover plates 14 are designed to fill the gap between the security plug enclosure 5 and the mating USB connector 31. These cover plates 14 may be used to cover one or more nearby USB or other computer ports. Cover plates 14 may be formed in different shapes to allow flexible deployment options in different computers having different arrangement of USB ports.

FIG. 4 schematically illustrates a high-level functional diagram of the same self-locking USB security plug 20 according to the exemplary embodiment of the current invention illustrated in FIG. 3 above wherein in this figure the self-locking USB security plug device is inserted into the host's USB jack 31.

During initial insertion of the USB plug device 20, into the protected computer 30 USB jack 31, USB plug contacts 12 of self-locking USB security plug 20 are touching host USB connector 31 mating contacts 33 to connect the authentication chip 27 USB interface to the connected computer USB bus to start device authentication (assuming that the computer is powered on). Once the coupled Authentication and security function 27 is powered and recognizes initial insertion state it shall provide positive user indications through LED 19 that illuminate in green color. Authentication failure may be indicated through LED 19 illumination in red color. An authentication state of "failure" is caused if the security plug does not recognized by security software as belonging to the organization or was not paired to the specific computer or port where it was inserted.

Any attempt to remove the USB security plug 20 by force would damage the computer USB jack 31 and as the authentication chip 27 is disconnected from protected computer 30 USB port contacts 33 it would be detected by the computer monitoring software application (not shown in this figure) and treated as a security event. A security event may trigger one or more of the corrective actions stated above.

It should be noted that a security events may optionally be detected, logged and acted by the plug. For example, If the security software was removed or disabled in the host and the plug is powered for a preset duration without authentication, the event may optionally be logged in the plug as a security event. This security event may permanently put the plug in a "failure" state. Alternatively, the event may be logged and reported to the security software once it has been restored.

FIG. 5 depicts a mechanical diagram of the self-locking USB security plug of the current invention illustrated in FIGS. 3 and 4 above.

When same self-locking USB security plug 20 is inserted, its enclosure 5 is almost entirely embedded inside the protected computer USB jack 31. Only its faceplate 22 and LED 19 are visible when it is inserted into the protected computer 30 USB jack 31.

The self-locking USB security plug metal body enclosure 5 is made of thin formed metal sheet material (for example stainless steel or Phosphor Bronze) to provide mechanical strength and tampering protection.

The self-locking USB plug 20 is shaped to enter the mating USB jack and is equipped with the two locking tooth 8a and 8b designed and shaped to enter the mating USB jack 31 grounding tab holes 34 (as shown in FIGS. 3 above).

In the depicted embodiment, springs 16a and 16b are integral part of the body 5 of self-locking USB plug 20 and force locking tooth 8a and 8b respectively into the corresponding grounding tab holes 34 in USB jack 31. The front edges of locking tooth 8x are slanted such that they flex springs 16x towards PCB 21 as self-locking USB plug 20 is inserted into USB jack 31. When completely inserted, springs 16x return to their original shape forcing force locking tooth 8a and 8b respectively into the corresponding grounding tab holes 34 in USB jack 31.

The back edges of locking tooth 8x are slanted such that if self-locking USB plug 20 is pulled in an attempt to pull it out of USB jack, locking teeth 8x further penetrate into the grounding tab holes 34 in USB jack 31. This causes springs 16x to be bent upwards and the whole connector is bent upwards as well. This increases the locking effect and the mechanical strength in which self-locking USB plug 20 is locked in USB jack 31. As a result, attempt to remove USB plug 20 is locked from USB jack 31 is likely to cause destruction of USB plug 20, USB jack 31 or both.

In the depicted embodiment, locking tooth 8x (in here "x" may stand for the letters "a", "b", etc.) are constructed as part of spring surfaces 16x to provide proper flexible force against the mating USB connector 31 and to support positive locking.

Once the self-locking USB security plug device 20 USB plug 13 is fully inserted into the host USB jack 31, locking teeth 8x penetrates the USB jack shielding tab holes 34 and therefore mechanically secure the USB security plug device into position inside host USB jack 31. Small PCBA (Printed Circuit Board Assembly) 21 is having gold contacts 12 printed on it on the top side. Authentication chip 27 (not shown in this figure) is soldered or bonded to the bottom side of this PCBA 21 together with all other required electronic components such as LED 19.

Metal faceplate 22 is preferably welded to the metal body 5 of the self-locking USB plug 20 to provide proper mechanical strength and therefore to resist potential tampering. For example, Ultrasonic welding may be used to weld faceplate 22 to the metal body 5 of the self-locking USB plug 20. Alternatively, other strong materials may be used.

Preferably, faceplate 22 is at least slightly larger than the size of USB jack 31. In particular this metal faceplate 22 is used:
a. To shield and protect the electronic components in the internal PCBA 21;
b. To prevent an attempt to insert a thin tool such as screwdriver between the inserted self-locking USB plug body 5 and the protected computer 30 USB jack 31 metal body in attempt to force locking teeth 8x out of shielding tab holes 34 and remove the device; and
c. To prevent the removal of the optional cover plates 14 shown in FIGS. 3 and 4 above.

FIG. 6 schematically illustrates a high-level block-diagram of self-locking USB HID (Human Interface Device) security filter having a unidirectional data diode function 40 according to another exemplary embodiment of the present invention.

This embodiment of the current invention is complementing the self-locking USB plug embodiment shown in FIGS. 3 to 5 above by enabling secure connection of standard USB keyboard and USB mouse to the protected computer.

The self-locking USB HID security filter having a unidirectional data diode function 40 in this embodiment of the current invention comprises an enclosure 37.

Enclosure 37 is having a permanently attached USB cable 28 coupled to a self-locking USB plug 35. Optionally, USB cable 28 is a shielded cable having a shield for example a metal shield or braded steel shield to protect the inner electric conductors within the cable against attempts to connect a USB device directly to them. Cable 28 is terminated with a self-locking plug 35 which is over-molded by plastic jacket 15 to permanently attach USB cable 28 to the self-locking plug 35 and to the protected computer 30.

Self-locking USB plug 35 is mating with the protected computer 30 USB jack USB jack 31 and is similar in its construction to the self-locking USB plug 13 of device 20 shown in FIGS. 3 to 5 above. Self-locking USB plug 35 electrical contacts are coupled through lines 9x to the permanently attached USB cable 28. USB cable 28 is permanently attached to the device enclosure 37. USB signals from USB cable 28 are coupled to the USB hub function 29 upstream port 66. USB hub function 29 may be standard two-port USB 1.1 or USB 2.0 hub or other USB hub. The USB hub function 29 downstream USB ports 47a and 47b are coupled to the Authentication Chip (AC) 32 and to the Device Emulator function (DE) 36 respectively.

Authentication Chip (AC) 32 bay be using a standard anti-counterfeiting chip such as InsideSecure VAULTIC405 that provides the following Cryptographic Services:
  Public Key Pair Generation
  Digital Signature
  Encryption/Decryption
  Message Digest
  Key Wrapping/Unwrapping
  True Random Number Generation (RNG)
Additionally, AC 32 may support the following Cryptographic Algorithms:
  DES/3DES
  AES 128/192/256 bits
  RSA up to 4096 bits
  DSA up to 2048 bits
  ECC up to 384 bits
Additionally, AC 32 may support the following:
  FIPS 140-2 Industry Standard Identity-based authentication using password, Secure Channel Protocol (SCP02/SCP03) or Microsoft® Minicard Driver strong authentication.
  Rights Management (Administrator, Approved User, Non-approved User, etc.)
  Embedded Dynamic FAT12 File System with internal memory for secure data storage of keys and attributes.]

USB user keyboard and mouse USB jacks 24a and 24b are coupled to Host Emulator functions (HE) 25a and 25b respectively. Host emulator functions 25x emulates a standard PC USB HID host stack by receiving user keyboard and mouse entries (keyboard and mouse are not seen in this figure) and converting them into a proprietary unidirectional serial data streams 67x respectively.

Host Emulator functions 25x is preferably a microcontroller, ASIC (Application Specific Integrated Circuit), FPGA (Field Programmable Gate Array), System on a Chip or any other computing function that is capable of performing the required emulation. Host emulator functions 25x may be integrated into a single electronic component to reduce the device cost and complexity.

67x from Host Emulator functions 25x is coupled to the unidirectional data enforcing device 26. Unidirectional data enforcing device 26 is preferably and optical isolator, inductive isolator or any other electronic circuitry capable of assuring unidirectional data flow. From the unidirectional data enforcing device 26 the proprietary unidirectional data stream 65 is coupled to the Device Emulator function (DE) 36. Device emulator function 36 emulates a standard PC keyboard and mouse devices by receiving proprietary unidirectional data stream 65 from Host Emulators 25x and generating matching user keyboard and mouse entries over USB port 47b. USB downstream port 47b is coupled through the hub function 29 to the protected computer USB port 31.

Device Emulator function 36 is preferably a microcontroller, ASIC (Application Specific Integrated Circuit), FPGA (Field Programmable Gate Array), System on a Chip or any other computing function that is capable of performing the required emulation.

In some embodiments, one USB jack 24 connected to one HE 25 is used. In other embodiments (such as seen in FIG. 6) a plurality of USB jacks 24x are used, each coupled to a corresponding HR 25x (two are seen herein, but more may be used by extending the topology). Unidirectional serial data transfer from Hex to USB Hub 29 may be done by one of few options which were not shown in the figure to prevent its cluttering:
1. Having two independent unidirectional data enforcing devices 26a and 26b. Each connected to a different serial input line in the DE 36;
2. Linking the Host emulators 25x together (implementing them in one microcontroller with two USB stacks), then combining the output into one USART to make a single unidirectional output stream;
3. Adding a SYNC line between the HE 25x to allow time sharing of a single connected serial output line (5 mS for first HE and then 5 mS for the other for example).

In this embodiment of the current invention LED 19 is coupled to authentication chip 27 to provide user indications of the device security state. LEDs 19a and 19b are coupled to the Host Emulator functions 25a and 25b to provide user indications of the device port status. Such indications may include: red illumination if connected device is being rejected (device is not HID), green if device is accepted, etc.

Tamper Evident sticker 18 may be fitted on the device enclosure 37 to provide clear user indications in case that the enclosure 37 is being mechanically tampered. Such sticker is preferably holographic surface having a special adhesive layer. Once the label is peeled or removed—clear indications of such removal appears in or under that label. Tamper Evident sticker 18 may change color or expose text such as "Void" if peeled from the enclosure 37 surface.

It should be noted that the USB hub 29, Authentication chip 32 and Device Emulator functions may be integrated inside one microcontroller chip to reduce the device complexity and cost. Hub may be eliminated if integrated device may support a composite device having authentication function together with USB HID device. Further cost reduction is possible if one or more Host Emulator 25x function may be also integrated into the same chip.

The self-locking USB HID security filter having a unidirectional data diode function 40 is coupled to a software application running on the protected computer 30 that performs continues USB port monitoring and authentication to assure that all USB ports are properly protected by self-locking USB security plugs 15, cover plates 14 and HID filters 40. Protected computer 30 may be coupled to one or more Centralized Security Management Servers (CSMS) 199 through Local Area Network (LAN) or Wide Area Network (WAN) 197. CSMS may comprise of local or remote data base 190 that stores the system events log and the protected computers configuration. It can also send warnings or alerts to the security administrator in case that security event such as USB plug device removal was detected. Warnings may be sent through SMS (192), email (191) or other communication methods.

Optionally, AC 32 may cut communication with USB jacks 24x when a security event was detected, for example failure to authenticate in front of a security software installed in the host 30, or detection of an unauthorized device connected to USB jacks 24x. Communication with USB jacks 24x may be cut by disabling one or few of: DE 36, unidirectional data enforcing device 26, or HEs 25x.

It should be noted that the security device 40 may be used to filter USB devices other than HID through pre-programmed profile or through field programming of the allowed device profiles. Programming may be performed using a USB Type-A to USB Type-A cable connecting USB port 24x to a mobile phone, a laptop, a proprietary programming device or a computer. The optional re-programming changes the filtering operation defined below.

Since re-programming is a security risk, in some embodiments all electronics in USB HID security filter 40 is hardware, non programmable.

In some embodiments USB HID security filter 40 is programmable only during manufacturing In some embodiments USB HID security filter 40 is programmable only by authorized users through a connected computer (not seen in the figures) having special software application. It may be preferred to use a separate (administrative) computer having special software application for this purpose and not install the special software application on the user computer 30 as user computer 30 preferably should not be able to modify the operation of its USB plugs. For example, the computer having special software application may be a mobile or laptop computer and interface with the USB UID security filter via USB plug 24.

In some embodiments the HE 25a is a microcontroller having a flash memory for storing the re-programmable filtering characteristics. Optionally, the microcontroller supports encrypted memory functions to secure these filtering characteristics.

In some embodiments the "filtering" process of USB HID security filter 40 is based on at least one of:
a. The HE 25x are capable of interfacing only with the intended USB devices based on their USB characteristics (such as: Class, Sub-class, protocol, Products ID, Vendor ID, etc.),
b. The HE 25x are capable of producing only the commands associated with the intended USB devices and programmed to block all other USB traffic.
c. The DE 36 is capable of receiving and producing commands associated with the intended USB devices.

The use this self-locking HID filter security device described herein having emulators and unidirectional data enforcing device provides the following security advantages over direct connection of USB keyboard/mouse to the host device:
a. It blocks USB devices other than keyboard/mouse;
b. It is capable of blocking unknown USB device connected behind USB hubs or composite USB devices;
c. It prevent abusing of the keyboard/mouse as mail-box to leak information between computers;
d. It prevents the removal of the legitimate USB device and the connection of an unauthorized device instead;
e. It prevents any data transfer from protected computer 30 to the outside world; and
f. It prevents certain types of social attacks that use tampered/modified USB devices.

FIG. 7 illustrates a high-level functional diagram of a self-locking USB HID filter of the current invention similar to the device illustrated in FIGS. 6 above wherein the exemplary embodiment depicted in this figure the device 140 does not have a unidirectional data enforcing device 26 (as shown in FIG. 6 above). The removal of the unidirectional data enforcing device 26 reduces the device cost and also enables return communication from protected computer to the keyboard or mouse. This enables functions such as Caps Lock, Num Lock and Scroll Lock LEDs in keyboards to operate normally.

One disadvantage of this design compared to the design shown in FIG. 6 above is that the system is less secure and therefore more vulnerable to targeted attacks. However DE 36 and or HE 25x may use filtering process to reduce the risk by blocking unauthorized data transfer.

FIG. 8A illustrates a high-level functional diagram of another USB security filter 180 having a Qualification Microcontroller function 46 according to another exemplary embodiment of the current invention.

Qualification Microcontroller 46 is having a USB host port 56 coupled to a USB mode select switch 39 that switch the USB signals from the device USB port 24.

Upon power-up, or connection of un unknown USB device to port 24, the mode select switch 39 controlled by the Qualification Microcontroller 46 via line 57 is switched to pass USB signals to the Qualification Microcontroller 46 host USB port 56. Qualification Microcontroller 46 is then enumerating the connected device and compares the received enumeration parameters with the permitted parameters pre-programmed on it.

Such pre-programmed parameters may include one or more of the following USB characteristics: USB device class, USB device sub-class, protocol, manufacturer ID, Device name, and device serial number, hub and composite device end-point characteristics etc.

If the received parameters are matching the permitted parameters, the Qualification Microcontroller 46 command the mode select switch 39 to switch to the other position— passing USB signals to USB line 55 that is coupled to the USB hub 29 second downstream port 89. USB hub 29 is coupled to the protected computer 30 USB port 31 through permanently connected USB cable 28 and self-locking USB plug 35.

Allowed USB device profile may be loaded by the user when device 180 is already attached to the protected computer through a USB Type-A to USB Type-A cable connected to device port 24.

LED 99 is coupled to the Qualification Microcontroller 46 to provide user indications of the connected device qualification state. Green illumination may indicate that device is qualified (accepted) while red may indicate that device was rejected (not permitted).

To reduce clattering in FIG. 8, one device USB jack 24a is used in connection with one mode select switch 39, one QM 46 and one LED 99. It should be noted that the device may be extended to use two (or more) device USB jacks by duplicating the required elements.

In some embodiments, the device includes means to detect and protect against replacing an authorized USB device connected to USB plug 24a with a different, potentially hostile device.

In some embodiments line 58 was added to detect device disconnect from USB jack 24a. USB Hub 29 may have internal registers that can be polled by QM 46 through line 58 (which may use be I2C protocol for example) to find the real time status of each downstream port.

Additionally or alternatively, Current sensor 59 may be added on the device power lines in order to detect the exact current consumed by the device. This will further enhance the security of this apparatus by sensing abnormal power consumption conditions. For example if USB mouse is having an internal cellular modem—this may be sensed by high peaks in the current. QM may have an A/D input that will sample these currents after current sense amplifier 61 and compare them with normal behavior characteristics programmed into it. Current sense 59 may be shunt resistor or an integrated current sensor with amplifier 59.

FIG. 8B schematically illustrates a high-level functional diagram of another USB security filter according to another exemplary embodiment of the present invention. In this embodiment, QM 49 is connected to USB plug 24x at all times via line 856. On power-up, USB mode select switch 39 disconnects USB plug 24x from the rest of the electronics. Once the user device is authenticated by QM 46, USB mode select switch 39 connects USB plug 24x to the rest of the electronics (in this example to USB Hub 29. However, this embodiment may be combined with other embodiments disclosed herein and USB mode select switch 39 connects USB plug 24x to a corresponding HE 25x, or may connect an HE 25x with unidirectional device 26, or may connect a unidirectional device 26 with a DE 36, etc.)

QM 46 continue to monitor data exchange with USB jack 24x and if suspicious activity is detected QM 46 commands USB mode select switch 39 to revert to the secure (disconnected) state.

Optionally QM 46 may report a security event to AC 32 via an optional reporting line 857. QM 46 may attempt to re-enumerate the user UBB device connected USB jack 24x before reporting a security event to AC 32.

FIG. 8C schematically illustrates a high-level functional diagram of another USB security filter according to yet another exemplary embodiment of the present invention.

In this embodiment a physical disconnection detector 98, for example a micro switch, is installed at USB jack 24x to detect user USB device disconnect and cause QM 46 to repeat the enumeration process.

FIG. 9A schematically depicts a mechanical diagram of the same self-locking USB security filter such as embodiments 40, 140 and 180 of the current invention illustrated in FIGS. 6 to 8 above.

Self-locking plug 35 is over-molded by plastic jacket 15 to permanently attach USB cable 28 to the protected computer 30 USB port 31 (not shown in this figure).

At the other end, USB Cable 28 is permanently connected to the enclosure 37 that hosts the device electronic components PCBA. Optionally enclosure 37 is made of plastic. Alternatively, enclosure 37 is made of metal and is welded, for example ultrasonically to deter tampering. Tampering Evident sticker 18 is placed on the enclosure 37 parting-link to assure that the sticker will be damaged if an attempt is made to open the enclosure 37 in order to tamper with the device PCBA.

In this exemplary embodiment, device USB jacks 24a and 24b are stacked USB connectors. LEDs 19a and 19b are placed near their respective USB jacks 24a and 24b to provide clear user indications of the connected device state. However, a single device USB jack 24a may be used as seen in FIG. 8.

LED 19 provides user indications for the device security state for example through short light-pipe positioned underneath the plastic enclosure 37 surface.

Optionally, cable 28 is a reinforced cable having steel braid to deter physical access to electrical conductors within it.

FIG. 9B schematically illustrates mechanical diagrams of self-locking security plugs according to other exemplary embodiments of the present invention.

The embodiments 400a, 400b, 400c, 400d and 400e depicted in FIG. 9B(1) to 9B(5) respectively use a single housing 410a, 410b, 410c, 410d and 410e respectively instead of two parts (15 and 37 as in FIGS. 6, 7, 8A, 8B, 8C and 9A). In these embodiments cable 28 is missing or internal to the housing 410x Details of self-locking plug 35x (for example springs ad tooth) are not seen to reduce cluttering the drawings. Similarly, LEDs 19 and optional 19x are seen and marked only in FIG. 9B(1).

In embodiments 400a, 400b and 400e, the self-locking plug 35 (or of self-locking plugs 35a and 35b) are at substantially 90 degrees to USB jack 24 or jacks 24a and 24b.

In embodiments 400c and 400d, of self-locking plug 35 (or of self-locking plugs 35a and 35b) are at substantially in line with USB jack 24 or jacks 24a and 24b.

In embodiment 400e there is only a single USB jack 24.

In embodiments 400a, 400c and 400e there is only a single USB plug 35.

In embodiments 400b and 400d dual USB plugs 35a and 36b are used. In the case that two USB plugs 35a are used, they are spaced such that their distance is equal to the distance in a standard dual USB jack (such as seen in embodiments 400a to 400d, and in FIGS. 9A and 11). Self locking tooth or teeth may be used on one, and optionally on both USB plugs 35a and 36b. Similarly, electrical contacts may be used in on one, and optionally on both USB plugs 35a and 36b. For example, data connection may be used only in one of on one of the USB plugs 35x, while power connection (used for example for disconnect detection) may be used on both USB plugs 35x.

In embodiments 400b and 400d where dual USB plugs 35a and 36b, and dual USB jacks 24a and 24b are used, each USB plug and jack may be performed independently, for example as seen in FIGS. 8A, 8B and 8C.

FIG. 10 illustrates a mechanical diagram of the self-locking security plug 35 shown in FIGS. 6 to 9 above in greater details.

USB cable 28 is over-molded by the plastic jacket 15 having USB logo embossed on it.

The self-locking plug 35 is made of stainless-steel, Beryllium Copper or any other suitable metal sheet formed into USB plug shape, having USB contacts 12 placed on insulator 91. Metal part 95 also formed to include two leaf springs 16a and 16b that are bent to form tooth 8a and 8b respectively.

Once the plug 35 is inserted inside the protected computer 30 USB jack 31, it locks inside that jack permanently through the two tooth 8a and 8b that prevent removal by force.

FIG. 11 illustrates an unprotected computer 30 rear panel 44, having 6 exposed USB jacks 31a to 31f as used in the prior art.

In this drawing, exposed USB jacks 31a to 31f are seen on rear panel 44 of housing 944 of unprotected computer 30. However, exposed USB jacks may be located on other parts of the housing 944, for example on the (not seen here) front panel, or top panel.

Unexposed USB ports may be present on the computer boards, for example the motherboard (not seen here) located within housing 944 of unprotected computer 30.

These USB jacks may be used to plug various USB devices and therefore regarded as security vulnerability. While other ports seen in this figure are exposed and vulnerable, they may be protected using other means not disclose herein.

FIG. 12 schematically illustrates a simplified flow-chart diagram of the preparations phase before protecting the unprotected computer 30 shown in FIG. 11 above.

In step 1—user or administrator having proper system privileges logs 900 on to the Centralized Management System (CMS). It is desirable from security perspective that only selected users in each organization deploying the protection device of the current invention shall have the highest privileges needed to access the preparation phase tools.

In step 2—after successfully logging on to the CMS, the user may receive 901 new protection devices into the organization. New devices are initialized before deployment and their specific characteristics are recorded in the CMS database 905.

Initialization is required in order to prevent usage of devices purchased by attacker from being deployed or being used as substitute of authentic authorized devices.

New device initialization may be performed through means such as:

1. User scanning unique device serial number barcode from device packaging 911 through the use of a barcode reader 910;
2. User typing unique device serial numbers using standard keyboard; and
3. User receives an email with list of supplied devices serial numbers once shipment is received.

Once new device serial numbers and characteristics is properly loaded into the CMS database 905 it is ready for assignment to specific new or existing computer.

In step 3 new unprotected computer 30 is detected 902 by the CMS through the LAN (Local Area Network) or WAN (Wide Area Network) if located remotely.

In step 4 upon detection of a new computer, the CMS load and install 903 the security application 920 into computer 30. Security application 920 is preferably be installed at the lowest possible level to assure that it would not be circumvented by other operating system services or applications. For example BIOS/UEFI level application is referable over operating system installed application.

In steps 5a (904) to 5n (906), the CMS together with the installed security application 920 attempting to detect and identify all USB ports available in computer 30. USB ports identified may be divided automatically or manually into different categories based on parameters such as:

Internal USB ports that are not used;
Internal USB ports used to interface fixed internal USB device;
External USB devices located at the rear panel; and
External USB devices located at the front panel.

Internal USB ports are typically not considered as a security threat and therefore may remain unprotected. Alternatively internal unused USB ports may be also protected through using a self locking protection device of the current invention that is adapted to interface mechanically and electronically with the internal USB connector.

Detected USB port information is loaded into the protected computer database 921 and into the CMS database 905.

After all USB ports of computer 30 were detected and identified, in step 6 (907) the user may assign specific roles for each port. For example: one port will be used for HID filter protection device, another for USB printer that is protected through a programmable filter device. All other external USB ports shall be assigned to USB self-locking protection plug devices or covered with the cover plates.

Following the optional assignment of step 6, in step 7 (908) the CMS may open a support ticket to notify the appropriate field technician that the unprotected computer 30 is ready for protection device installation. This information may be sent to the technician by the CMS through an email, SMS or any other messaging method.

FIG. 13 illustrates a simplified flow-chart diagram of the USB protection devices installation phase on the unprotected computer 30 shown in FIGS. 11 and 12 above.

In step 1—(950) the technician connects the unprotected computer 30 to the network and to the power and turns it on.

In step 2—(952) the computer shall boot and automatically run the USB security application 920 installed on it in the previous phase (see FIG. 12 step 4 above).

In step 3—(953) the USB protection software 920 disables all USB ports for normal use.

In step 4—(954) the USB protection software 920 communicates with the Centralized Management System (CMS) server 970 over the network 972 and gets the authorization to enter the Installation mode.

Once in the Installation mode, the USB protection software will prompt the technician which ports should be protected or covered during the installation phase.

In the next steps 5a (955) to 5n (956) the technician is instructed to place each one of the USB protection devices (963a to 963n respectively) at the appropriate computer 30 USB ports. This is done through textual or graphical instructions (for example a drawing or a short video clip). The technician may be instructed to use protective devices such as:

Self-locking USB protection plugs;
Self-locking USB HID filters;
Self-locking USB Programmable filters; and
Various cover plates to cover nearby ports.

Each one of the inserted USB protection devices is being authenticated (961a to 961n respectively) against the unique key entered into the databases 921 and 905 during the preparations phase (FIG. 12 step 2).

Once the protection device is properly authenticated and approved, its LED will start blinking in green color.

The technician may then connect to the protected computer 30' the required USB peripheral devices via the self-locking USB protection filters (for example USB keyboard, USB mouse and USB printer as can be seen in the next figure).

It should be noted that the connection of USB peripheral devices to the protected computer may be recorded (logged) as a security event by the USB protection software 920 on local database 921 and by the CMS server 970 on database 905.

Such information may include:
1. USB device class and sub-class;
2. USB device vendor ID and product ID;
3. USB device protocol;
4. Current consumed by the USB device (average, peaks); and
5. Time, date and USB port of connection attempt or of power up cycle when new device was first discovered (in the case that protected computer 30' was off when connection attempt was made).

This information may be used by the CMS to generate alarms and warning. For example, the CMS may be programmed to send a real-time alert when an attempt is made to connect to protected computer self-locking USB filter a mass-storage class device.

FIG. 14 schematically illustrates a system 220 using the same computer 30' of the pervious FIG. 11 with self-locking USB protection devices of the current invention installed to protect it.

USB port 31a is having a self-locking USB plug 20 (seen in FIGS. 3 to 5) of the current invention to prevent connection of any USB device. USB ports 31b to 31d are covered by cover plate 14a that is secured in place by the self-locking USB plug 20.

USB jack 31e is having a self-locking HID filter device such as device 40, 140 or 180, connected to it through USB plug 35, cable 28, and enclosure 37.

User keyboard 17 and mouse 23 are plugged into the filter device jacks 24a and 24b respectively (not shown in this figure).

USB jack 31f is covered by cover plate 14b that secured by the self-locking USB plug 35. It should be noted that similar method may be used to protect exposed USB jacks located elsewhere on the protected computer 30 (for example on its front panel).

Optionally, cover plate 14a may be secured in place by a plurality, for example two self-locking USB plugs 20. Alternatively, cover plates are not used, and each unused USB port is plugged with a self-locking USB plug 20.

This installation of the embodiments of the current invention of the protected computer 30' by preventing the possibility to connect any unauthorized USB devices and therefore provides proper protection from various social attacks or USB devices misuse.

FIG. 15 schematically illustrates a simplified flow-chart diagram of the protected computer 30' shown in FIGS. 13 and 14 above, being powered up. It should be noted that normal power up process is illustrated here as it may introduce some security threats to the organization. During power off cycles, the protected computer 30' may be tampered or attacked to leak data from the organization. For this reason it is desirable that protected computer 30' will remain connected to the network and powered up throughout its life cycle.

In step 1 (980) the protected computer 30' is powered up and boot.

In step 2 (981) the USB security application 920 running on computer 30' takes control of all USB ports.

In step 3 (982) the USB security application disable all USB ports by default.

In step 4 (983) the USB security application 920 reads from its database 921 its latest USB protection configuration and attempt to compare it with the information stored in the CMS server 970 database 905. If the CMS data is identical or if the USB security application 920 is configured to work off-line then it will start enabling each one of the used USB ports and authenticate the devices 983a to 983n in steps 5a (984) to 5n (985) respectively.

Once all USB protection devices 963a to 963n are successfully authenticated, the USB security application 920 logs all events in step 6 (989) at the local database 921 and at the CMS database 905.

In the next step 7 (990) the USB ports having self-locking filters are being enabled for normal use and the USB devices connected to these filters are being identified and logged in the databases 9021 and 905 as well.

It should be noted that the whole power up cycle is being logged in the local and in the CMS databases to allow proper tracking of asset power states in the organization.

FIG. 16 schematically illustrates a simplified flow-chart diagram of the protected computer 30' shown in FIGS. 13 to 15 above, being tampered while operating.

In this figure tampering is done through an attempt to remove first USB protection device 963a from its USB port.

In step 1—(991) the protected computer 30' is operating normally.

In the following steps 2a (992) to 2n (993) the USB security application 920 is periodically scanning its USB ports to authenticate the connected USB protection devices (963a to 963n respectively). This periodical re-authentication 994 is done at pre-programmed intervals to assure that the protective means are still connected and are the authentic parts as recorded in the local database 921 and in the CMS database 905. Optionally, re-authentication 994 is done at random order and/or intervals, or include random re-authentication to thwart the ability to learn the re-authentication sequence and time attacks between re-authentications.

If someone attempts to remove a self-locking USB protection device (963a in this example), the USB security application 920 will fail to authenticate this port. This authentication failure 995 is then recorded 984 on the local database 921 and also recorded 1000 on the CMS database 905 and treated as a security event.

Such security event may trigger a real-time warning message sent to one or more pre-defined recipients 1001 through email or SMS 1002.

In the next step 4—(999) the USB security application 920 may disable all USB ports to prevent potential data theft or other security threats. Optionally other security steps are taken such as halting the operation of computer 30' or disabling access to its disks, etc.

Similar steps are used to detect and respond to other risks such as tampering with any of the USB protection devices or connecting to an internal unprotected USB port.

FIG. 17A schematically illustrates a high-level block-diagram of an internal USB security plug 1020 according to yet another exemplary embodiment of the present invention.

Internal USB security plug 1020 is intended to be plugged to a USB port 1014 internal to housing 944, for example on printed board 1015, for example a motherboard.

Internal USB port 1014 is the internal USB header (typically 5, 9 or 10 position male connector 0.1" pitch)

Internal USB security plug 1020 comprises a receptacle connector 1013 mating connector 1014. Receptacle connector 1013 is having receptacle contacts 1012, typically soldered to the PCB 1016 of internal USB security plug 1020.

Optionally, PCB 1016 is an exposed PCB, alternatively PCB 1016 is enclosed in a enclosure 1021.

The electronic construction and the operation of internal USB security plug 1020 are similar or identical to the electronic construction and the operation of USB security plug 20. In internal USB security plug 1020, LED 19 is optional.

Preferably, USB security application 920 running on computer 30' fitted with internal USB security plugs 1020 tests that each of the internal USB ports in computer 30' are protected by a corresponding authenticated internal USB security plugs 1020. Else, USB security application 920 running on computer 30' issues a security event and executes defensive measures such as listed above.

Optionally, internal USB security plug 1020 is permanently affixed to board 1015, for example by gluing or by using a mechanical attachment means.

FIG. 17B schematically illustrates a typical USB male (on left) and a receptacle connector (on the right).

These typical illustrations are not to be viewed as limiting.

It should be noted that technologies other than USB may also be similarly protected. If the jacks and plugs used in the other technology are not fitted with cavities (such as tab spaces 34 in the jack 31), other means of securing a protector device in the ports may be used. For example glue such for example epoxy or "superglue" may be used or other mechanical locking devices may be used.

Placing internal USB security plug, or a plurality of plugs 1020 on all the internal USB ports 1014 internal to housing 944 of the protected computing device prevents an attacker from connecting an unauthorized device to the internal USB port 1014. Such a device may be for example a storage device for downloading sensitive information from the computing device. Alternatively, an attacker may connect a device capavble of injecting hostile code into the computing device, get access to the secrete network connected to the computing device, or monitor the operation of the computing device.

If any of the internal USB security plug 1020 is removed, the security software would fail to authenticate the removed internal USB security plug and will cause the external self-locking USB security plug or plugs 20 and/or the externally mounted self-locking USB security filter or filters (40, 140 or 180) to indicate that the security of computing device has been compromised, And further, if the attacker gain access to the inside of the computing device to replace an internal USB security plug 1020, and also disabled, modified or removed the security program, the externally mounted self-locking USB security plug or plugs 20 and/or the externally mounted self-locking USB security filter or filters (40, 140 or 180) would fail to authenticate and would indicate that the security of computing device has been compromised, Thus, the exemplary embodiment of the current invention combines physical and hardware security layer with software security protection.

As used herein, the term "computer" "computing device" or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer".

Likewise, the term "chip" or "function" is not to be viewed as limiting to a single chip or a separate chip, as they may point out to a functional element in a block diagram.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A method of protecting a protected computing device comprising:
   A) a preparation stage comprising:
      providing a plurality of USB protection devices, wherein each of the protection devices comprises an authentication chip for interacting with a security software;
      obtaining identification of said plurality of USB protection devices;
      entering said identification of said plurality of USB protection devices into an organization database;
      installing said security application in the protected computing device;
      loading security keys associated with each of said identification of said plurality of USB protection devices from said organization database to said security application in the protected computing device;
      installing said plurality of USB protection devices into USB connectors of the protected device; and
      qualifying said plurality of USB protection devices by said security application; and
   B) an operation stage comprising:
      monitoring said plurality of USB protection devices by said security application;
      detecting at least one security event associated with at least one of said USB protection devices by said security application; and
      disabling the normal operation of the protected computing device by said security application.

2. The method of protecting a protected computing device of claim 1, wherein:
   the protected computing device is having a housing;
   said USB connectors of the protected device comprises at least two USB jacks exposed on the outside of said housing; and
   said installing said plurality of USB protection devices into USB connectors of the protected device comprises installing USB protection devices on all the USB jacks exposed on the outside of said housing.

3. The method of protecting a protected computing device of claim 2, wherein:
   said USB connectors of the protected device further comprises at least one unused USB connector located entirely inside said housing; and
   installing said plurality of USB protection devices into USB connectors of the protected device further comprises installing a USB protection device on each unused USB connector located entirely inside said housing.

4. The method of protecting a protected computing device of claim 3, further comprising:
   in response to said detecting a security event, said security application:
   disabling all said unused internal USB connectors;
   disabling all said exposed USB jacks;
   disabling operation of all said protection devices; and
   providing visual indication to the user.

5. The method of protecting a protected computing device of claim 1, wherein:
   the protected computing device is having a housing;
   said USB connectors of the protected device comprises at least one unused USB connector located entirely inside said housing; and
   installing said plurality of USB protection devices into USB connectors of the protected device comprises installing a USB protection device on each said unused USB connector located entirely inside said housing.

6. The method of protecting a protected computing device of claim 1, wherein said at least one security event comprises removal of at least one USB protection device.

7. The method of protecting a protected computing device of claim 1, wherein said at least one security event comprises detection of:
   at least one USB jacks exposed on the outside of said housing which is not protected by a USB protection device; or
   at least one unused internal USB connector entirely inside said housing which is not protected by a USB protection device.

* * * * *